US007170421B2

(12) United States Patent
Iseki

(10) Patent No.: US 7,170,421 B2
(45) Date of Patent: Jan. 30, 2007

(54) CONTROL APPARATUS, CONTROLLED APPARATUS, AND REMOTE CONTROL SYSTEM AND REMOTE CONTROL METHOD USING THESE APPARATUSES

(75) Inventor: Takanobu Iseki, Kamakura (JP)

(73) Assignee: Fujisoft ABC Inc., Kamakura (JP)

(*) Notice: Subject to any disclaimer, the term of this patent is extended or adjusted under 35 U.S.C. 154(b) by 319 days.

(21) Appl. No.: 10/865,832

(22) Filed: Jun. 14, 2004

(65) Prior Publication Data
US 2004/0224676 A1 Nov. 11, 2004

Related U.S. Application Data

(63) Continuation of application No. PCT/JP02/12985, filed on Dec. 11, 2002.

(30) Foreign Application Priority Data
Dec. 14, 2001 (JP) ............................. 2001-381417
Nov. 28, 2002 (JP) ............................. 2002-346067

(51) Int. Cl.
G08C 19/00 (2006.01)
H04Q 7/20 (2006.01)
(52) U.S. Cl. ..................... 340/825.69; 340/825.74; 455/420; 455/418; 455/512; 370/444; 370/455; 370/470; 370/506

(58) Field of Classification Search ........... 340/825.69, 340/825.74; 455/420, 418, 512; 370/444, 370/455, 470, 506
See application file for complete search history.

(56) References Cited

FOREIGN PATENT DOCUMENTS

| JP | 6-170061 | 6/1994 |
| JP | 10-294704 | 11/1998 |
| JP | 2000-51541 | 2/2000 |
| JP | 2000-135380 | 5/2000 |
| JP | 2002/238083 | 8/2002 |

Primary Examiner—Jeffery Hofsass
Assistant Examiner—Scott Au
(74) Attorney, Agent, or Firm—Oblon, Spivak, McClelland, Maier & Neustadt, P.C.

(57) ABSTRACT

In one aspect of this invention, a control unit generates a frame having control data, and transmits it to a controlled apparatus via a transmission/reception unit or the like at a predetermined priority. In the controlled apparatus, a transmission/reception unit receives the frame, and a control unit analyzes it to generate a predetermined signal on the basis of the analysis result. The signal is output to a driving system or the like via an external I/O or the like. The controlled apparatus generates a response frame and transmits it to the control apparatus. In the control apparatus, the control unit analyzes the contents of the response frame, and a predetermined display is provided on the LED of an output unit on the basis of the analysis result.

12 Claims, 11 Drawing Sheets

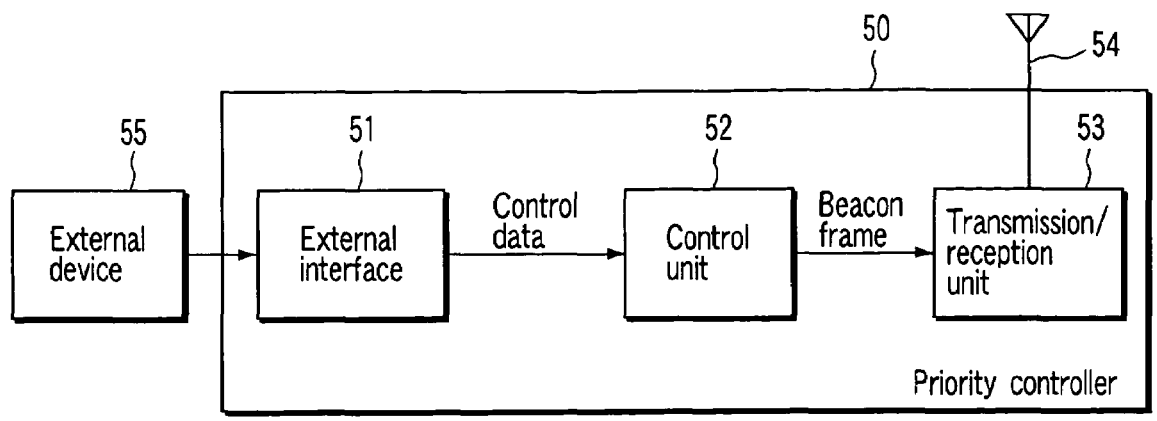
F I G. 3
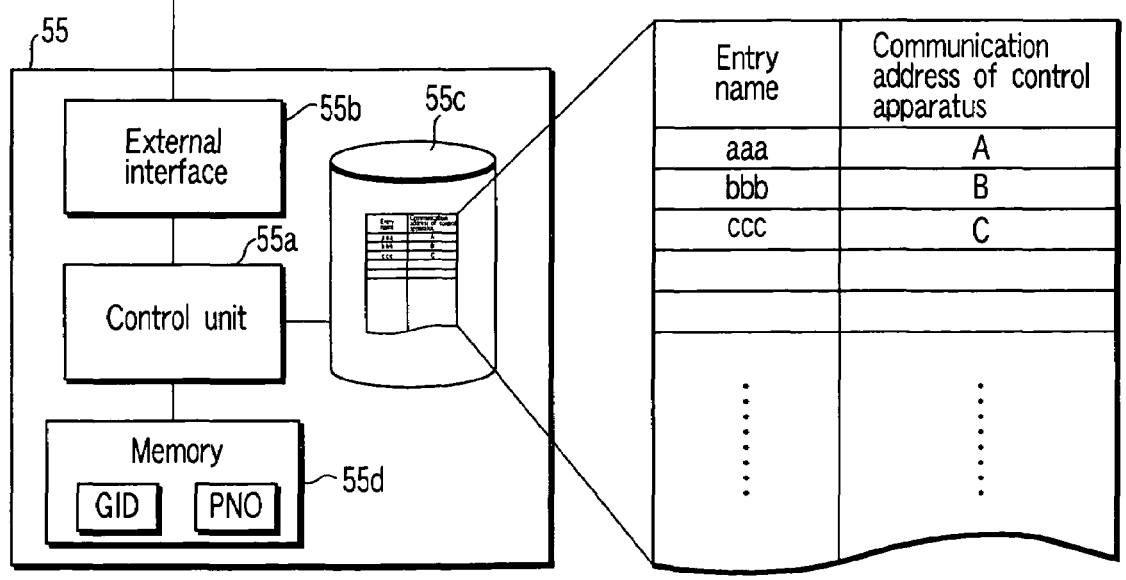
F I G. 4

CONTROL APPARATUS, CONTROLLED APPARATUS, AND REMOTE CONTROL SYSTEM AND REMOTE CONTROL METHOD USING THESE APPARATUSES

CROSS-REFERENCE TO RELATED APPLICATIONS

This is a Continuation Application of PCT Application No. PCT/JP02/12985, filed Dec. 11, 2002, which was not published under PCT Article 21(2) in English.

This application is based upon and claims the benefit of priority from prior Japanese Patent Applications No. 2001-381417, filed Dec. 14, 2001; and No. 2002-346067, filed Nov. 28, 2002, the entire contents of both of which are incorporated herein by reference.

BACKGROUND OF THE INVENTION

1. Field of the Invention

The present invention relates to an apparatus, system, method, and the like utilizing, e.g., a digital radio communication technique and, more particularly, to a control apparatus and controlled apparatus for preventing a communication failure and realizing accurate remote control even in a situation in which pairs of control apparatuses and controlled apparatuses simultaneously use the same frequency, and a remote control system and remote control method using these apparatuses.

2. Description of the Related Art

Various techniques have conventionally been developed for a remote control system comprised of a control apparatus and controlled apparatus. For descriptive convenience, a control apparatus including building components such as an operation input unit and output unit will be called a "propo". A controlled apparatus including building components such as a driving system and sensor will be called a "robot". In this case, the concept "robot" includes a model car, airplane, and the like.

Generally in existing techniques, the number of available frequencies is defined by law. The same frequency can be technically used by only one pair of a propo and robot at the same time. These days, tournaments in which robots are driven and controlled by radio communication using propos and have a match under predetermined rules are held in various places.

For example, in a radio control section in a so-called robot sumo tournament, a robot is driven and controlled from a remote place by radio communication using a propo. In radio control, an instruction by the operator must be accurately transmitted to the robot via the propo. For this purpose, a communication failure between the propo and the robot must be prevented during the match.

As a method of preventing a communication failure, there are proposed a method of storing and managing a propo by the governing body of the tournament and a method of managing available frequencies.

Of these methods, according to the latter method of managing available frequencies, a quartz crystal (to be referred to as a crystal hereinafter) for a channel used by a propo and robot is lent every match, and returned after the match.

In the former method of storing and managing a propo by the governing body of the tournament, if the governing body stores a propo but a contestant possesses and operates a spare propo, the propo may inhibit communication, affecting the match.

In the latter method of managing available frequencies, crystals incorporated in a propo and robot must be frequently inserted and removed every match. The crystals may cause a contact failure at communication contacts inside the propo and robot. The contact failure may lead to a communication failure during the match.

As described above, only storage/management of a propo or management of available frequencies, which have been adopted in the prior art, cannot satisfactorily prevent a communication failure.

For future team competitions, robots corresponding to propos must be controlled using many propos without any confusion.

For this purpose, communication channels must be ensured for at least the number of robots which participate in a match. However, the number of available frequencies is defined by law, and simultaneous use in the same frequency band is also limited to several pairs of propos and robots which are commercially available at present.

BRIEF SUMMARY OF THE INVENTION

The present invention has been made to overcome the conventional drawbacks, and has the following objects. More specifically, it is an object of the present invention to provide a control apparatus and controlled apparatus which utilize a digital radio communication technique, prevent a communication failure, enable assignment of many communication channels, realize two-way communication at a high transmission rate, and abruptly increase the data communication amount even in a situation in which pairs of control apparatuses and controlled apparatuses simultaneously use the same frequency, and a remote control system and remote control method using these apparatuses.

It is another object of the present invention to provide a control apparatus and controlled apparatus which properly freely set priority of transmission by each control apparatus in accordance with external communication without changing the control apparatus and controlled apparatus, and can preferentially control a specific target on the basis of the priority while preventing a communication failure even in a situation in which pairs of control apparatuses and controlled apparatuses simultaneously use the same frequency, and a remote control system and remote control method using these apparatuses.

To accomplish the above object, one aspect of the present invention, a remote control system, which allows radio communication in a situation, comprising: a plurality of pairs of control apparatuses; and controlled apparatuses; that are respectively made to correspond to each other in advance simultaneously use a same frequency; each of set control apparatus including; first input/output section for external connection, first control section for controlling to transmit a first frame to the controlled apparatus on the basis of a predetermined priority by generating the first frame having at least one of information obtained via the first input/output section and information on the controlled apparatus corresponding to the control apparatus, and controlling to externally output a first signal via the first input/output section by analyzing a second frame from the controlled apparatus, and first transmission/reception section for transmitting the first frame generated by the first control section to the controlled apparatus on the basis of the predetermined priority, and receiving the second frame from the controlled apparatus, and each controlled apparatus including; second transmission/reception section for receiving the first frame from the control apparatus, and transmitting the second frame to the control apparatus, second input/output section for external connection, and second control section for analyzing the first frame to externally output a second signal via the second input/output section, and generating the second frame having at least one of information obtained via the second input/output section and information on the control apparatus corresponding to the controlled apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 3 is a block diagram showing the arrangement of a priority controller 50 adopted in a remote control system according to the third embodiment of the present invention;

FIG. 4 is a view showing control (priority setting) of the priority controller 50 by an external device 55;

DETAILED DESCRIPTION OF THE INVENTION

Embodiments of the present invention will be described with reference to the drawings. The outline of the present invention will be explained for easy understanding of the present invention.

In ensuring many communication channels, it is not practical to assign each control apparatus a dedicated frequency, like a radio controller commercially available at present.

Considering this, the present invention is characterized in that a "digital radio communication technique" is applied, and accurate, complicated control is performed while a communication failure is prevented even in a situation in which pairs of control apparatuses and controlled apparatuses simultaneously use the same frequency. The present invention is also characterized in that a large amount of data can be divided into frames and communicated in two directions by, e.g., time division between a control apparatus and a controlled apparatus. The number of pairs which actually use the same frequency at the same time in the present invention will be described later.

The present invention makes its features more effective by employing a "priority controller" in the arrangement and operation to be described later. That is, when pairs of control apparatuses and controlled apparatuses simultaneously use the same frequency, priority is given to transmission of a frame from a specific control apparatus on the basis of a predetermined priority under comprehensive control not by a contestant but by a promoter who stands objectively and independently in various tournaments.

Embodiments of the present invention will be described in detail below on the basis of the outline.

The first embodiment of the present invention will be explained.

Figure 1B:
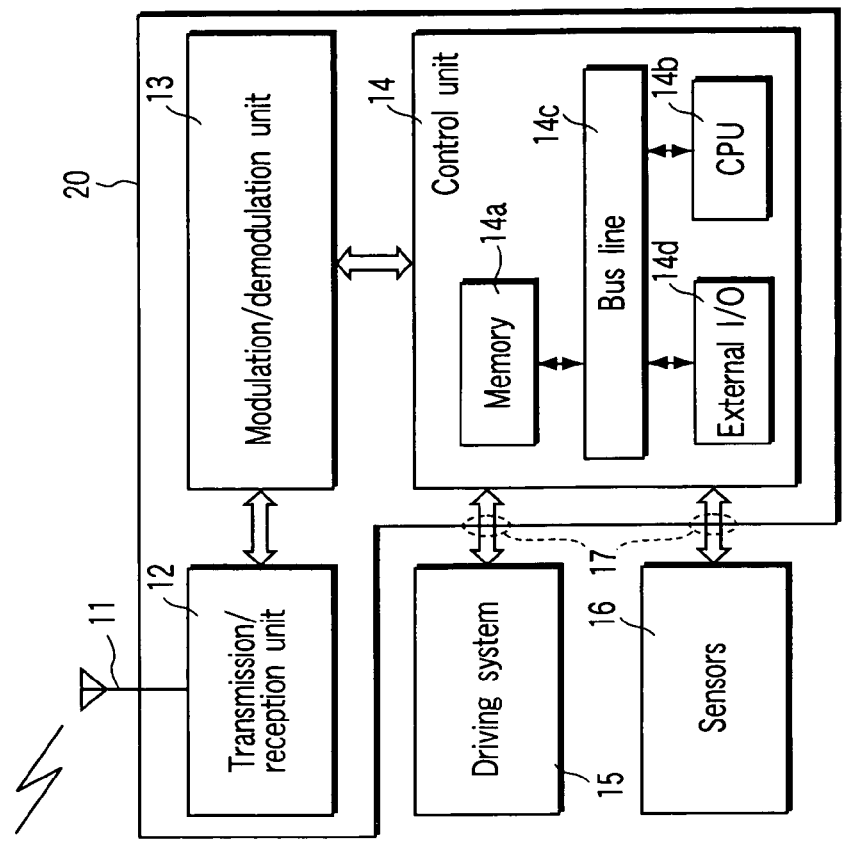
FIG. 1B is a block diagram showing the arrangement of a controlled apparatus according to the first embodiment of the present invention.
Figure 1A:
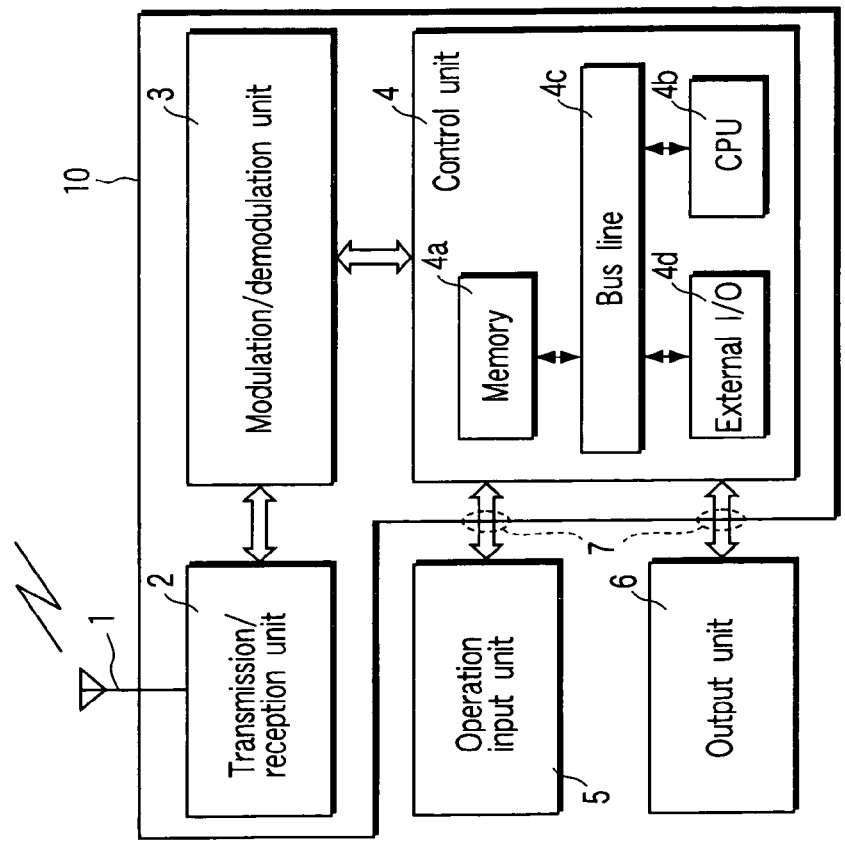
FIG. 1A is a block diagram showing the arrangement of a control apparatus according to the first embodiment of the present invention.

FIGS. 1A and 1B show the arrangements of a control apparatus, controlled apparatus, remote control system using these apparatuses, and the like according to the first embodiment of the present invention.

More specifically, FIG. 1A shows the detailed arrangements of a control apparatus 10, operation input unit 5, and output unit 6. FIG. 1B shows the detailed arrangements of a controlled apparatus 20, driving system 15, and sensors 16. Each unit will be explained in detail.

As shown in FIG. 1A, the control apparatus 10 comprises a communication unit made up of an antenna 1, transmission/reception unit 2, modulation/demodulation unit 3, and control unit 4. The communication unit is a minimum building component for the control apparatus 10, and the control apparatus 10 may include other building components in addition to the communication unit.

More specifically, the control unit 4 includes a memory 4a, CPU 4b, and external I/O 4d which are connected via a bus line 4c so as to freely communicate with each other. The transmission/reception unit 2 is made up of a transmitter and receiver, and has, e.g., an antenna switch, power amplifier circuit, and frequency conversion circuit (none of which is shown). The modulation/demodulation unit 3 is roughly divided into a modulator which modulates data and a demodulator which demodulates data.

The external I/O 4d of the control unit 4 is connected to at least the external operation input unit 5 and output unit 6 via a communication port 7 so as to freely communicate with them. The operation input unit 5 has a control stick, various switches, and the like. The output unit 6 has, e.g., an LED for displaying the state of the controlled apparatus 20. Further, the output unit 6 comprises, e.g., an audio output unit, vibration output unit, and various display units (none of which is shown).

First control means defined in claims and control means defined in claim 6 correspond to, e.g., the control unit 4. First transmission/reception means defined in claims and transmission/reception means defined in claim 6 correspond to, e.g., the transmission/reception unit 2. First input/output means defined in claims and input/output means defined in claim 6 correspond to, e.g., the communication port 7 which connects the control unit 4, operation input unit 5, and output unit 6. However, these means are not limited to them.

As shown in FIG. 1B, the controlled apparatus 20 comprises a communication unit made up of an antenna 11, transmission/reception unit 12, modulation/demodulation unit 13, and control unit 14. The communication unit is a minimum building component for the controlled apparatus 20, and the controlled apparatus 20 may include other building components in addition to the communication unit. The control unit 14 includes a memory 14a, CPU 14b, and external I/O 14d which are connected via a bus line 14c so as to freely communicate with each other.

The transmission/reception unit 12 of the controlled apparatus 20 is made up of a transmitter and receiver, and has, e.g., an antenna switch, power amplifier circuit, and frequency conversion circuit (none of which is shown).

The modulation/demodulation unit 13 is roughly divided into a modulator which modulates data and a demodulator which demodulates data. The external I/O 14d of the control unit 14 is connected to at least the driving system 15 and the sensors 16 via a communication port 17 so as to freely communicate with them.

The driving system 15 includes, e.g., a motor for driving the controlled apparatus 20.

The sensors 16 include various components such as a speed sensor, position sensor, temperature sensor, image sensing element, vibration sensor, and microphone. However, the sensors 16 are not limited to them.

Second control means defined in claims and control means defined in claim 7 correspond to, e.g., the control unit 14. Second transmission/reception means defined in claims and transmission/reception means defined in claim 7 correspond to, e.g., the transmission/reception unit 12. Second input/output means defined in claims and input/output means defined in claim 7 correspond to, e.g., the communication port 17 which connects the external I/O 14d, external driving system 15, and sensors 16. However, these means are not limited to them.

In this arrangement, in the control apparatus 10, data (to be referred to as control data hereinafter) on the states of the control stick and various switches included in the external operation input unit 5 are loaded into the CPU 4b of the control unit 4 via the communication port 7, external I/O 4d, and bus line 4c. The CPU 4b creates a frame having at least the control data. The frame undergoes a predetermined modulation process by the modulation/demodulation unit 3, and is sent to the controlled apparatus 20 via the transmission/reception unit 2 and antenna 1 on the basis of a predetermined priority. The predetermined priority is determined on the basis of a value set in, e.g., factory shipment.

The frame transmitted from the control apparatus 10 to the controlled apparatus 20 corresponds to a first frame defined in claims. However, the first frame is not limited to this.

A frame transmitted from the controlled apparatus 20 is received by the transmission/reception unit 2 via the antenna 1 of the control apparatus 10. The frame is demodulated via the modulation/demodulation unit 3, and supplied to the CPU 4b of the control unit 4.

The frame transmitted from the controlled apparatus 20 to the control apparatus 10 corresponds to a second frame defined in claims. However, the second frame is not limited to this.

The CPU 4b analyzes the contents of the frame, generates a signal on the basis of the analysis result, and supplies the signal to the output unit 6 via the I/O 4d and communication port 7. The output unit 6 displays the state of the controlled apparatus 20 on, e.g., the LED. When, for example, the state of the controlled apparatus 20 has four aspects, the LED displays green/orange/red/black (OFF) in correspondence with each aspect. However, the display state is not limited to this.

The output unit 6 also displays "outside of a communication range" (e.g., display of "outside of a communication range", field strength, and error rate). In addition, the output unit 6 can output a sound, vibrations, and an image. A signal output to the output unit 6 corresponds to a first signal defined in claims and a predetermined signal defined in claim 6. However, the first signal and predetermined signal are not limited to this.

In the controlled apparatus 20, a frame transmitted from the control apparatus 10 is received by the transmission/reception unit 12 via the antenna 11. The frame is demodulated by the modulation/demodulation unit 13, and supplied to the CPU 14b of the control unit 14.

The CPU 14b analyzes the frame and extracts control data on, e.g., the states of the control stick and various switches included in the operation input unit 5. The CPU 14b generates a control signal on the basis of the control data, and outputs the control signal to the external driving system 15 and sensors 16 via the external I/O 14d and communication port 17.

The external driving system 15 and sensors 16 are also driven and controlled by the control signal. A second signal defined in claims and a predetermined signal defined in claim 7 correspond to the control signal. However, the second signal and predetermined signal are not limited to this.

In the controlled apparatus 20, the CPU 14b of the control unit 14 generates a frame having data on the status. The frame is demodulated by the modulation/demodulation unit 13, and sent to the controlled apparatus 20 via the transmission/reception unit 12 and antenna 11.

At this time, data from the driving system 15 or sensors 16 may also be contained in the frame.

The control apparatus 10 and controlled apparatus 20 having the above-described arrangements and operations construct a remote control system according to the first embodiment. A communication method by the remote control system corresponds to a remote control method according to the present invention.

The control apparatus 10 and controlled apparatus 20 are assigned unique communication addresses (to be simply referred to as communication addresses hereinafter) in shipment or the like.

When the communication port 7 of the control apparatus 10 and the communication port 17 of the controlled apparatus 20 are connected by, e.g., a cable, the control units 4 and 14 communicate with each other to recognize the communication addresses of the partners. The communication addresses are held in the memories 4a and 14a. By repeating a configuration by a series of processes, the communication addresses of a plurality of controlled apparatuses 20 are held in the memory 4a in the control apparatus 10. One of the controlled apparatuses 20 is selected in accordance with, e.g., the settings of a setting switch included in the operation input unit 5 or control unit 4. "Made to correspond to each other in advance" in claims means, for example, this control.

Setting switches may be arranged in correspondence with the number of communication addresses which can be held in the control apparatus 10. Alternatively, a single setting switch may be adopted so that a desired one of communication addresses can be selected by operating the switch. A setting switch can also be arranged in the controlled apparatus 20, similar to the control apparatus 10. In this case, the communication addresses of a plurality of control apparatuses 10 are held in the memory 14a by repeating the above-described configuration. One of the control apparatuses 10 is selected by operating the setting switch or the like.

In the first embodiment, the communication standard complies with "IEEE 802.11" which is a wireless LAN standard established by working group 11 of the IEEE (the Institute of Electrical and Electronics Engineers) 802 meeting for a physical layer. Layers above a media access control sublayer (MAC; Media Access Control) are uniquely defined and simplified. However, these are merely an example, and the standard is not limited to this.

The effective communication range assumes several ten m or more indoors or in the absence of any obstacle. The numbers of simultaneously usable control apparatuses 10 and controlled apparatuses 20 are substantially unlimited.

The second embodiment of the present invention will be described.

Figure 2B:
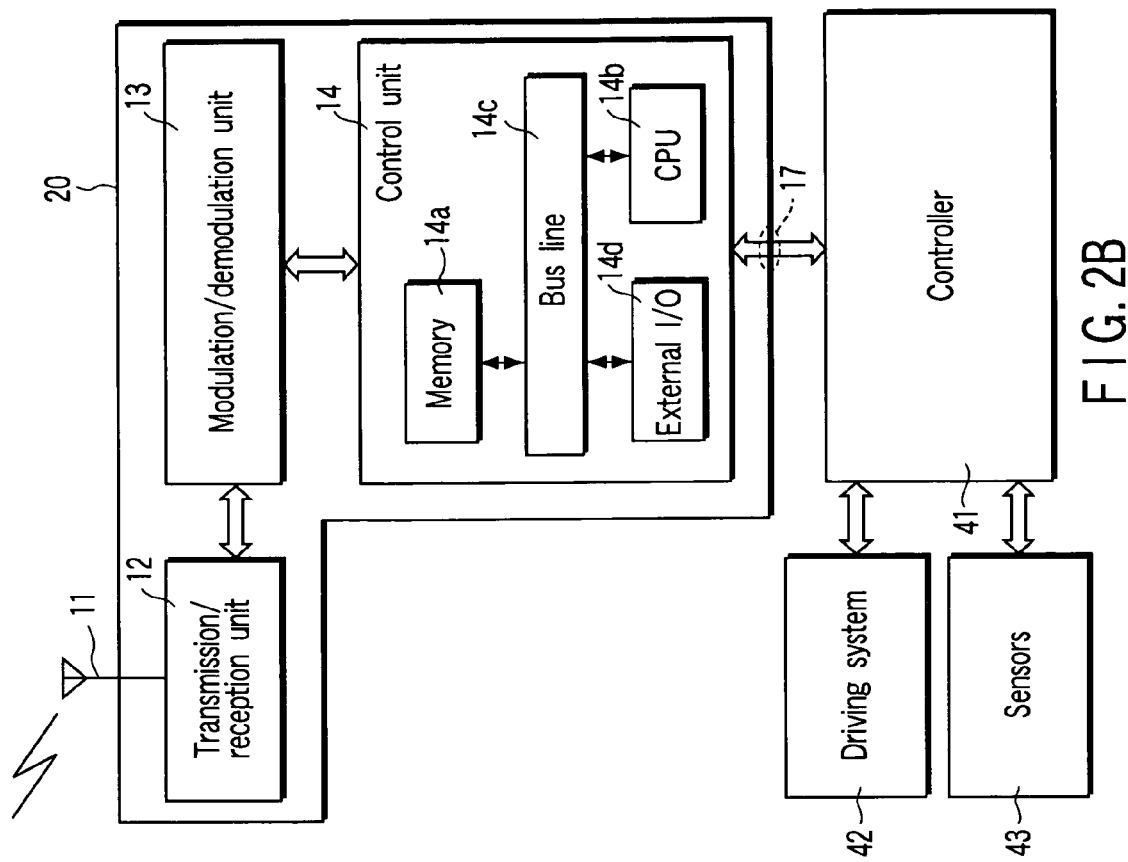
FIG. 2B is a block diagram showing the arrangement of a controlled apparatus according to the second embodiment of the present invention.
Figure 2A:
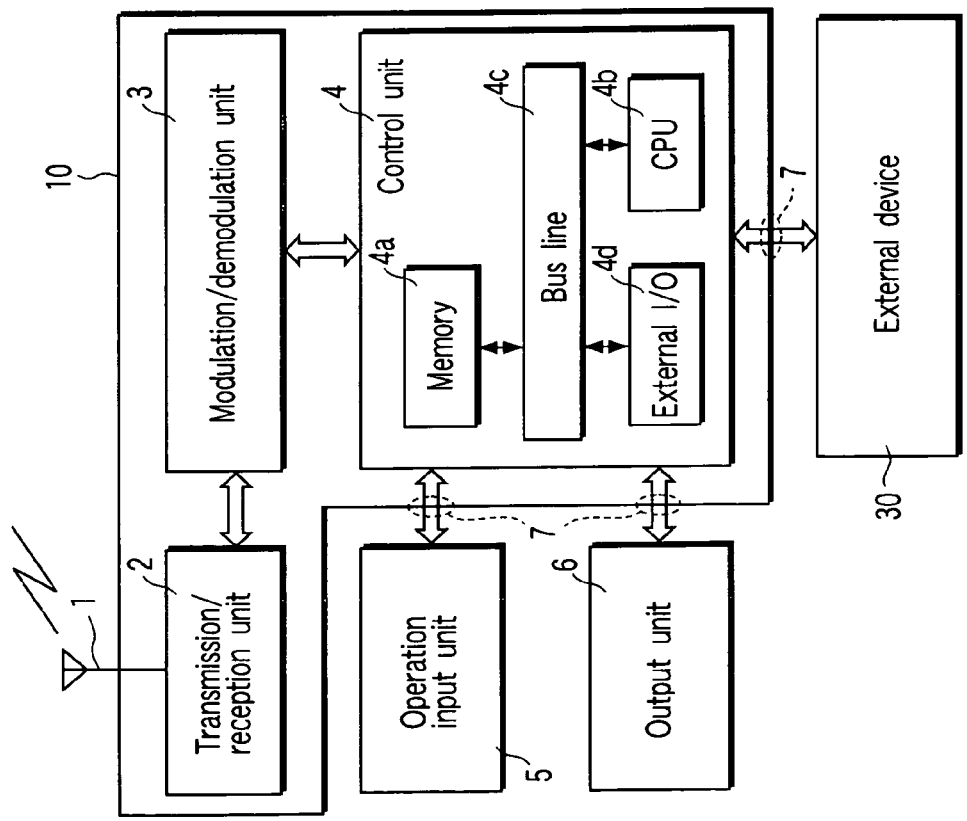
FIG. 2A is a block diagram showing the arrangement of a control apparatus according to the second embodiment of the present invention.

FIGS. 2A and 2B show the arrangements of a control apparatus, controlled apparatus, and remote control system using these apparatuses according to the second embodiment of the present invention. A communication method by the remote control system corresponds to a remote control method according to the present invention.

More specifically, FIG. 2A shows the detailed arrangements of a control apparatus 10, operation input unit 5, output unit 6, and external device 30. FIG. 2B shows the detailed arrangements of a controlled apparatus 20, controller 41, driving system 42, and sensors 43.

The same reference numerals in the first embodiment (FIGS. 1A and 1B) denote the same parts, and characteristic parts will be mainly explained.

A repetitive description of the correspondence with claims will be omitted.

As a feature of the second embodiment, the control apparatus 10 is connected to the external device 30 via an external I/O 4d of a control unit 4 and a communication port 7, as shown in FIG. 2A. The external device 30 can be a personal computer (to be simply referred to as a PC hereinafter) or the like. In this case, the control apparatus 10 and external device 30 are connected via, e.g., a standard interface of the PC so as to freely communicate with each other.

In this example, the external device 30 is an external arrangement independent of the control apparatus 10. The control apparatus 10 and external device 30 can also be integrated.

As another feature of the second embodiment, the controlled apparatus 20 is connected to the controller 41 via an external I/O 14d of a control unit 14, a communication port 17, and an expansion interface (not shown) so as to freely communicate with each other. The controller 41, the driving system 42 such as a motor, and the sensors 43 are so connected as to freely communicate with each other. The sensors 43 include various components such as a speed sensor, position sensor, temperature sensor, image sensing element, vibration sensor, and microphone. However, the sensors 43 are not limited to them.

In this arrangement, in the control apparatus 10, data (to be referred to as external data hereinafter) from the external device 30 is sent to a CPU 4b of the control unit 4 via the communication port 7 and external I/O 4d. The CPU 4b creates a frame having at least the external data. The frame is modulated by a modulation/demodulation unit 3, and sent to the controlled apparatus 20 via a transmission/reception unit 2 and antenna 1 on the basis of a predetermined priority. The frame containing external data also corresponds to the first frame defined in claims, but the first frame is not limited to this.

In the controlled apparatus 20, a frame from the control apparatus 10 is received by an antenna 11 and transmission/reception unit 12. The frame is demodulated by a modulation/demodulation unit 13, and supplied to the CPU 14b of the control unit 14. The CPU 14b extracts external data from the frame, and supplies the external data to the controller 41.

The controller 41 analyzes the contents of the external data, and drives and controls at least either the driving system 42 or the sensors 43 on the basis of the analysis result. In a response to transmission, data (e.g., speed, position, temperature, image, vibrations, or sound) associated with a measurement result by the driving system 42 or the like is also sent back to the control apparatus 10.

In the first embodiment described above, when the control stick or the like included in the operation input unit 5 of the control apparatus 10 is operated by the operator, the control data is supplied to the CPU 4b of the control unit 4. A frame having the control data is created by the CPU 4b, and transmitted to the controlled apparatus 20 via the modulation/demodulation unit 3, transmission/reception unit 2, and antenna 1. In the second embodiment, the external device 30 supplies, to the CPU 4b of the control unit 4, external data for designating a predetermined operation or the like. The CPU 4b creates a frame having the external data, and each frame is transmitted to the controlled apparatus 20 via the modulation/demodulation unit 3, transmission/reception unit 2, and antenna 1.

In other words, when external data for designating a predetermined operation or the like is transmitted from the control apparatus 10 to the controlled apparatus 20 in accordance with the above-described flow, the controller 41 of the controlled apparatus 20 analyzes the external data, drives and controls the driving system 42 and the like, and executes more complicated operation. That is, an intelligent controlled apparatus 20 is implemented. In this case, remote control of the controlled apparatus 20 on the basis of an operation input from the operation input unit 5 or the like can be achieved in addition to the above control. Note that external data has a wide concept including a command regarding an order/instruction.

A remote control system according to the present invention can be built by appropriately combining the arrangements of the control apparatus 10 and the like, the control apparatus 10 and the like and the external device 30, the controlled apparatus 20 and the like, and the controlled apparatus 20 and the like and the controller 41 in the remote control systems according to the first and second embodiments described above.

Further, one external device 30 can be connected to a plurality of control apparatuses 10 to comprehensively control them.

The third embodiment of the present invention will be described.

The third embodiment is characterized by adding a priority controller 50 to the arrangements of the first and second embodiments.

That is, a remote control system according to the third embodiment is implemented by a combination with the first and second embodiments. A communication method by the remote control system also corresponds to a remote control method according to the present invention. The priority controller corresponds to a priority controller defined in claims.

FIG. 3 shows the arrangement of the priority controller 50.

As shown in FIG. 3, the priority controller 50 comprises an external interface 51, control unit 52, transmission/reception unit 53, and antenna 54. The external interface 51 is, e.g., a standard interface of a PC, but is not limited to this.

In this arrangement, when an external device 55 sets priority of transmission by a control apparatus 10, control data on the setting is sent to the control unit 52 via the external interface 51. The control unit 52 generates data on priority on the basis of the control data, and generates a beacon frame containing the data on priority. The control unit 52 sends the beacon frame by a periodic beacon via the transmission/reception unit 53 and antenna 54. Upon reception of the beacon frame transmitted from the priority controller 50, the control apparatus 10 sets transmission priority on the basis of the data on priority that is contained in the beacon frame.

The data on priority contains information on individual priority of the control apparatus 10 and default priority of a data frame. A plurality of levels can be set for the priority, and the stop of operation can also be set.

When the control apparatus 10 does not receive any beacon frame, the priority is kept set at a default value. However, the present invention is not limited to these settings.

As described above, the remote control system according to the third embodiment further comprises the priority controller 50 which transmits a beacon frame containing, as the data on priority, at least the first data for specifying a control apparatus whose communication is given priority, the second data for specifying the priority controller 50, and the third data unique to a use opportunity. The control apparatus 10 comprises a memory 4a serving as a storage means which stores at least the fourth data for specifying the priority controller 50 and the fifth data unique to a use opportunity. When the first data specifies the control apparatus 10, the control unit 4 of the control apparatus 10 determines that the control apparatus 10 has the first priority, and controls to transmit a frame to a controlled apparatus 20 at a timing determined on the basis of the first priority. When the first data does not specify the control apparatus 10 but the second and third data originated by the priority controller 50 coincide with the fourth and fifth data stored in the memory 4a serving as the storage means, the control unit 4 determines that the control apparatus 10 has the second priority, and controls to transmit a frame to the controlled apparatus 20 at a timing determined on the basis of the second priority. When the first data does not specify the control apparatus 10 but either of the second and third data originated by the priority controller 50 coincides with the fourth and fifth data stored in the memory 4a serving as the storage means, the control unit 4 determines that the control apparatus 10 has the third priority, and controls to transmit a frame to the controlled apparatus 20 at a timing determined on the basis of the second priority.

First information to fifth information defined in claims have a wider concept including, e.g., the first data to fifth data described above.

Figure 5:
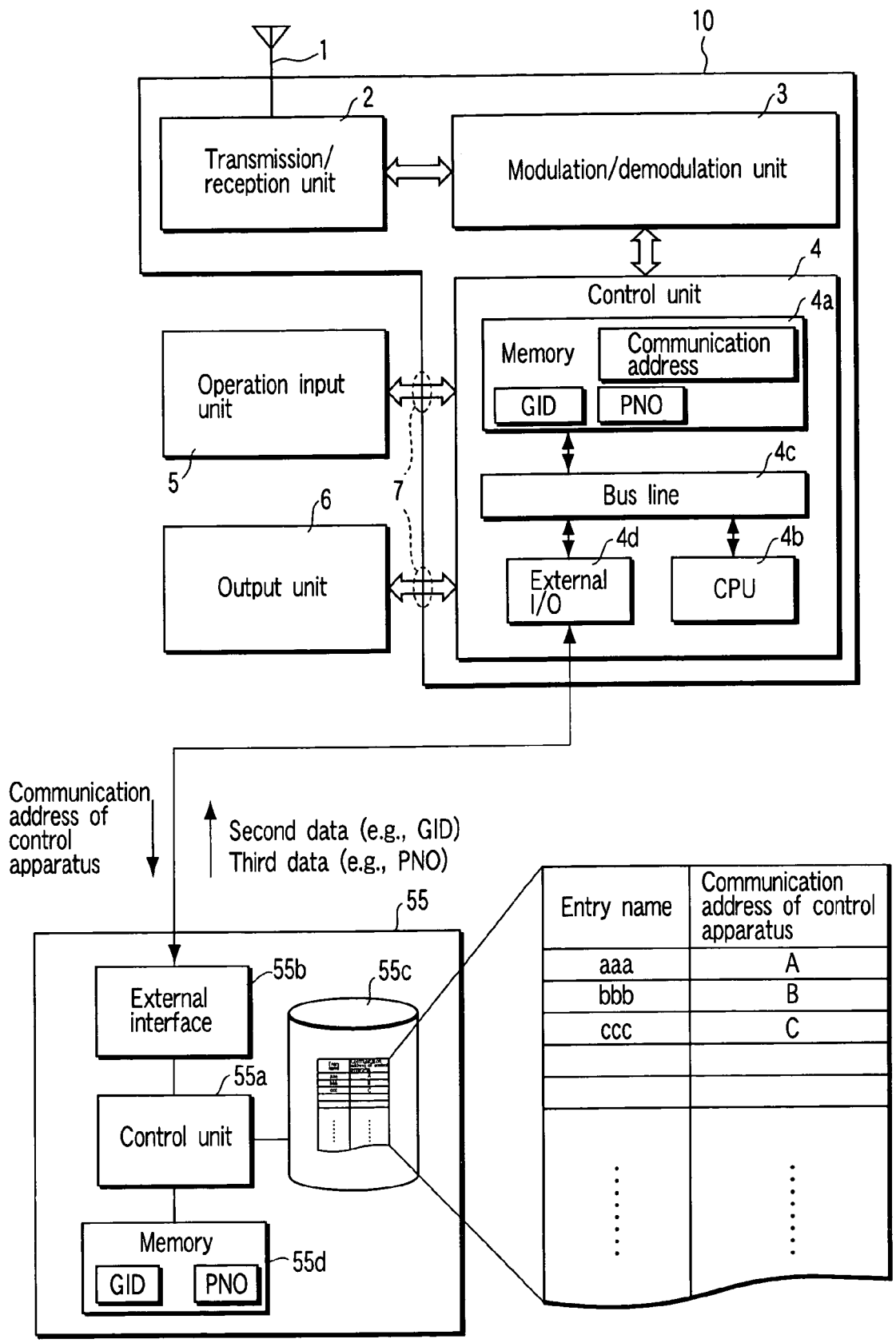
FIG. 5 is a view showing registration of a control apparatus 10 in the external device 55 (registration of the control apparatus 10)
Figure 6:
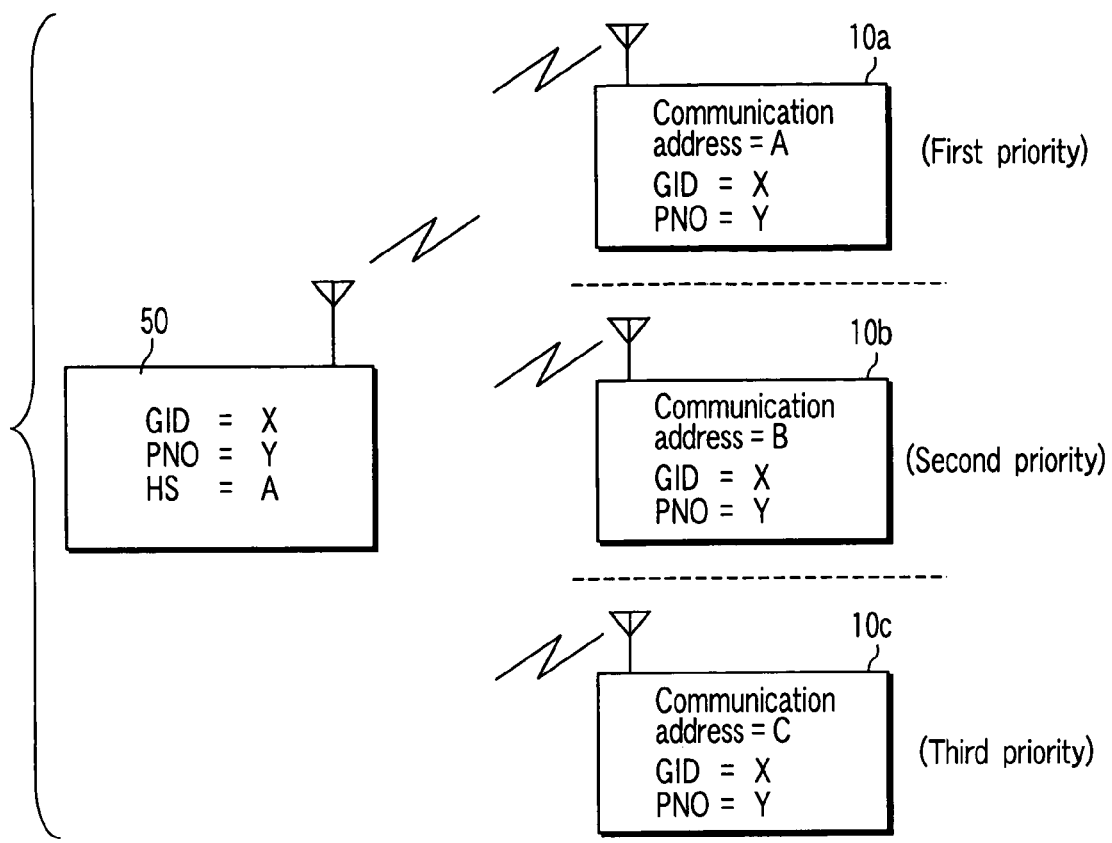
FIG. 6 is a view showing an example of the definition of priority.

FIG. 4 schematically shows control (priority setting) of the priority controller 50 by the external device 55. FIG. 5 schematically shows registration of the control apparatus 10 in the external device 55 (registration of the control apparatus 10). FIG. 6 shows an example of the definition of priority. These processes will be explained in detail.

As shown in FIG. 4, when the external device 55 sets priority for the priority controller 50, the external interface 51 of the priority controller 50 and an external interface 55b of the external device 55 are connected by a cable or the like so as to freely communicate with each other. The external device 55 comprises at least a control unit 55a which controls the entire external device 55, the external interface 55b, and a database 55c. For example, in an application to a robot sumo tournament, the database 55c stores "entry name" and "communication address" for the control apparatus 10 in association with each other, which will be described in detail. The structure of the database 55c shown in FIG. 4 is merely an example. The arrangement of the priority controller 50 has been described above.

As shown in FIG. 5, when the control apparatus 10 is to be registered in the external device 55, an external I/O 4d of the control apparatus 10 and the external interface 55b of the external device 55 are connected by a cable or the like so as to freely communicate with each other. The remaining arrangement has been described above.

In this state, a representative communication address of the priority controller 50 is loaded into the external device 55. In order to ensure a value uniquely assigned to each system, a communication address is utilized, but a unique value can also be realized by another method. The external device 55 further generates a value unique to a use opportunity. As a method of generating this value, a value may be generated from a date/time or the like, or a value prepared by incrementing (+1) a previous value may be used. However, the present invention is not limited to them. Independently of the above operation, the database 55c of the external device 55 registers a list in which "entry name" and "communication address of control apparatus" are stored in correspondence with each other.

In the connection shown in FIG. 5, the control apparatus 10 sends its communication address to the external device 55. The external device 55 registers the communication address in the database 55c. This operation is performed for each control apparatus. The communication addresses of the control apparatuses of all contestants are registered in the database 55c of the external device 55, and entry names and the communication addresses of the control apparatuses are associated with each other. After registration in the external device 55, the external device 55 transmits to the control apparatus 10 the second data for specifying the priority controller 50 and the third data unique to a use opportunity. The second and third data are stored in a memory 55d. The control apparatus 10 stores the second and third data in the memory 4a. When priority must be set (or changed) in the connection as shown in FIG. 4, the external device 55 transmits, to all priority controllers 50 used in the system, the first data for specifying a control apparatus whose communication is given priority, the second data for specifying each priority controller 50, and the third data unique to a use opportunity. The priority controller 50 stores the first to third data in a memory 52a, and generates a beacon frame on the basis of these data.

In the following description, for example, the first data is HS, the second data is GID, and the third data is PNO. The relationship between the data GID, PNO, and HS and the format of a beacon frame will be explained in detail later.

When a configuration by the process described above as an example ends, the priority of each control apparatus 10 is determined. In the third embodiment, priority is defined as follows. More specifically, the first priority is set when GID and PNO values in a beacon frame are equal to those stored in the memory of the control apparatus 10 and an HS value in the beacon frame is equal to that in the control apparatus 10.

The second priority is set when GID and PNO values in a beacon frame are equal to those stored in the memory of the control apparatus 10 but an HS value in the beacon frame is different from that in the control apparatus 10. The third priority is set when GID and PNO values in a beacon frame are different from those stored in the memory of the control apparatus 10. Note that first to third priorities defined in claims correspond to these priorities, but the priorities are not limited to them.

Also, the third priority is set when a single control apparatus 10 receives a plurality of beacon frames, and GID and PNO values in any beacon frame are different from those stored in the memory of the control apparatus 10.

When GID and PNO values in one of a plurality of beacon frames are equal to those stored in the memory of the control apparatus 10, priority is set to the first or second priority on the basis of the above-described definition. This definition of priority is merely an example, and the present invention is not limited to this.

FIG. 6 shows an example of simultaneously using three control apparatuses 10a, 10b, and 10c. In this example, the memory 52a of the priority controller 50 stores GID=X, PNO=Y, and HS=A.

That is, a beacon frame periodically originated from the priority controller 50 contains these values. In this example, the memory of the control apparatus 10a stores information "communication address=A, GID=X, and PNO=Y". The memory of the control apparatus 10b stores information "communication address=B, GID=X, and PNO=Y". The memory of the control apparatus 10a stores information "communication address=C, GID=X, and PNO=Z". In this example, the control apparatus 10c is assigned the first priority on the basis of the priority definition because the values GID (=X) and PNO (=Y) in the beacon frame are equal to the values GID (=X) and PNO (=Y) stored in the memory of the control apparatus 10a and the HS value (=A) in the beacon frame is equal to the communication address value (=A) of the control apparatus 10a. The control apparatus 10b is assigned the second priority because the values GID (=X) and PNO (=Y) in the beacon frame are equal to the values GID (=X) and PNO (=Y) stored in the memory of the control apparatus 10b but the HS value (=A) in the beacon frame is different from the communication address value (=B) of the control apparatus 10b. The control apparatus 10c is assigned the third priority because the value PNO (=Y) in the beacon frame is different from the value PNO (=Z) stored in the memory of the control apparatus 10c.

When expressed by, e.g., priority levels, the first, second, and third priorities correspond to priorities "high", "middle", and "low". It is also possible to set GID as the communication address of the priority controller 50 and HS as the communication address of a control apparatus whose communication is given priority.

The first to third embodiments of the present invention have been described. A remote control method by the remote control system will be described in detail.

When a frame is to be transmitted from the control apparatus 10 to the controlled apparatus 20 upon constructing the above-mentioned remote control system utilizing the digital radio communication technique, the control apparatus 10 divides data and adds a frame header to the data. Information on a frame check sequence (FCS) or the like is added in the media access control sublayer (MAC; Media Access Control) via the network layer and the logical link control sublayer (LLC; Logical Link Control) of the data link layer. As a result, a frame is formed and transferred as a bit string to the physical layer.

In communication between the control apparatus 10 and the controlled apparatus 20, whether a received frame does not have any omission and has normally been received is checked. If the frame is abnormal, a resending of the frame is requested from the transmitting side. If the receiving side is not in a state in which a frame can be normally received, the transmitting side must postpone transmission to adjust the temporal interval of the frame. These functions are provided by the LLC.

Figure 7:
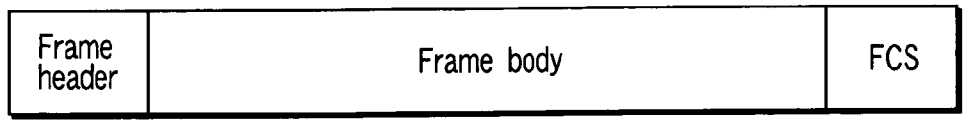
FIG. 7 is a view showing the format of a frame adopted in the first to third embodiments.

The frame has a format shown in FIG. 7.

As shown in FIG. 7, the frame is formed by a frame header field, frame body field, and FCS field. Of these fields, the "frame header field" is formed by a region which designates the data length of the frame by bytes, a region which stores information representing the type of frame, a region which designates the communication address of a receiving side, and a region which performs encryption control. The frame header field length changes depending on the type of frame.

Note that the type of frame such as Data (w/o AR), Data (with AR), ACK, Data+ACK (w/o AR), Data+ACK (with AR), or beacon (Beacon) is defined by information stored in the frame header field. In this case, (with AR) means "with response request", and (w/o AR) means "without response request".

The "data body field" is a region for storing a data body in a predetermined unit, and has a variable length. The "FCS field" is a region which stores information for detecting a frame error.

The FCS field stores a check value calculated by a value from the start of the frame header to the end of the frame body.

In this manner, the frame header field defines the type of frame. The formats of a Data frame, ACK frame, Data+ACK frame, and beacon (Beacon) frame will be sequentially described in detail.

The format of the "Data frame" will be explained.

The Data frame is a frame used to exchange control data and the like between the control apparatus 10 and the controlled apparatus 20. Data frames are roughly classified into fields "with response request (with AR)" which request a sending destination to confirm whether data has normally been received, and fields "without response request (w/o AR)" which do not require any confirmation. When a Data frame "with response request" is transmitted and the sending destination normally receives the Data frame, the sending destination sends back an ACK frame or Data+ACK frame.

The format of the "ACK frame" will be explained.

The ACK frame is a frame which, when a frame "with response request (with AR)" is normally received, is sent back to the transmitting side in order to notify the transmitting side of a message to this effect.

The format of the "Data+ACK frame" will be explained.

As described above, when a frame "with response request (with AR)" transmitted from the transmitting side is normally received by the receiving side, the receiving side sends back an ACK frame as a response. When the latest data must be sent to the transmitting side, the receiving side can send a Data+ACK frame at once instead of individually sending a Data frame containing the latest data and the ACK frame.

The format of the "beacon (Beacon) frame" will be explained.

The beacon frame is used when the priority controller 50 sets priority of transmission by the control apparatus 10.

In this case, a plurality of levels can be set for the priority, and inhibition of operation can also be set. Also, a plurality of control apparatuses 10 can be grouped to comprehensively set priority for each group.

When one priority controller 50 is used, the communication address of the priority controller 50 is set in the subfield of the beacon frame. When a plurality of priority controllers 50 are used, a representative communication address is set.

The format of the beacon frame will be explained in more detail. The beacon frame is made up of a frame header and frame body. The frame header has at least a Dur subfield and GID subfield. In the Dur subfield, a communication time with the first priority designated by the beacon frame is set in a predetermined unit (e.g., μsec unit). If, for example, no first priority is set, 0 is set in the Dur subfield. The Dur subfield will be described in detail later. In the GID subfield, the communication address of the priority controller 50 which outputs a beacon frame is set.

According to one method, when one priority controller 50 is used, the communication address of the priority controller 50 is set, as described above. When a plurality of priority controllers 50 are used, a representative communication address is set.

The frame body of the beacon frame has a BI (Beacon Interval) subfield, DI (Data Interval) subfield, PNO subfield, LPI (Low Priority Interval) subfield, and HS subfield.

Of these subfields, in the BI subfield, the sending interval (to be referred to as BI hereinafter) of the beacon frame is set. In the DI field, the data transmission interval (to be referred to as DI hereinafter) of the control apparatus 10 which is set to the first or second priority is set in a predetermined unit (e.g., msec unit). Data PNO described above is set in the PNO subfield.

The data transmission interval (to be referred to as LPI hereinafter) of a control apparatus 10 having the third priority is set in the LPI subfield. For example, when the LPI value is set to 0, the control apparatus 10 having the third priority cannot transmit any data. The LPI value need not be an integer, and may be a value of 1 or less. The HS subfield sets the communication address (to be referred to as HS hereinafter) of a control apparatus 10 having the first priority.

In addition, a data body field "in encryption" will be explained. Encryption is possible in only the Data frame or Data+ACK frame.

A detailed communication method according to the present invention will be explained in detail.

The transmission interval (frame space) of the next frame after an immediately preceding frame is transmitted includes a short frame space (to be referred to as SIFS hereinafter), middle frame space (to be referred to as MIFS hereinafter), long frame space (to be referred to as LIFS hereinafter), and backoff.

The SIFS means the transmission interval of a frame in a frame sequence. The SIFS is applied to an interval between the completion of transmitting a Data frame and the start of transmitting a Data+ACK frame or ACK frame.

The MIFS is an interval set at the start of a sequence at the first priority. At other priorities, the LIFS or backoff is used.

The LIFS means the interval between a frame sequence and the next frame sequence. After the LIFS, backoff always occurs, which will be described in detail later. "Backoff" means a random interval set after the LIFS in order to avoid collision between frames.

Figure 8:
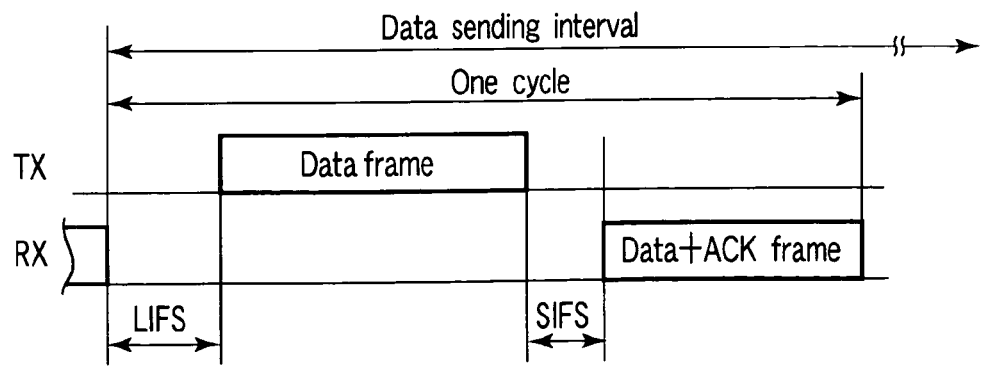
FIG. 8 is a view for explaining calculation of the maximum number of connectable apparatuses in the remote control system of the present invention.

Calculation of the maximum number of connectable apparatuses in the remote control system of the present invention will be explained with reference to FIG. 8. The maximum number can be calculated from the number of "one cycle"s which can be ensured at the data sending interval shown in FIG. 8. That is, the interval of "one cycle" is determined by the LIFS time, Data frame sending time, SIFS time, and Data+ACK frame sending time. The maximum number is calculated as several ten apparatuses at a data transmission rate of 2 Mbits/s, hundred-odd apparatuses at a data transmission rate of 11 Mbits/s, and several hundred apparatuses at a data transmission rate of 54 Mbits/s. It is apparent from this that many apparatuses can be simultaneously controlled. Simultaneous control of many apparatuses is a wide concept including a concept of simultaneously using pairs of apparatuses at the same frequency.

A data transmission/reception sequence in the remote control method of the present invention will be described in detail with reference to FIGS. 9 to 12.

Figure 9:
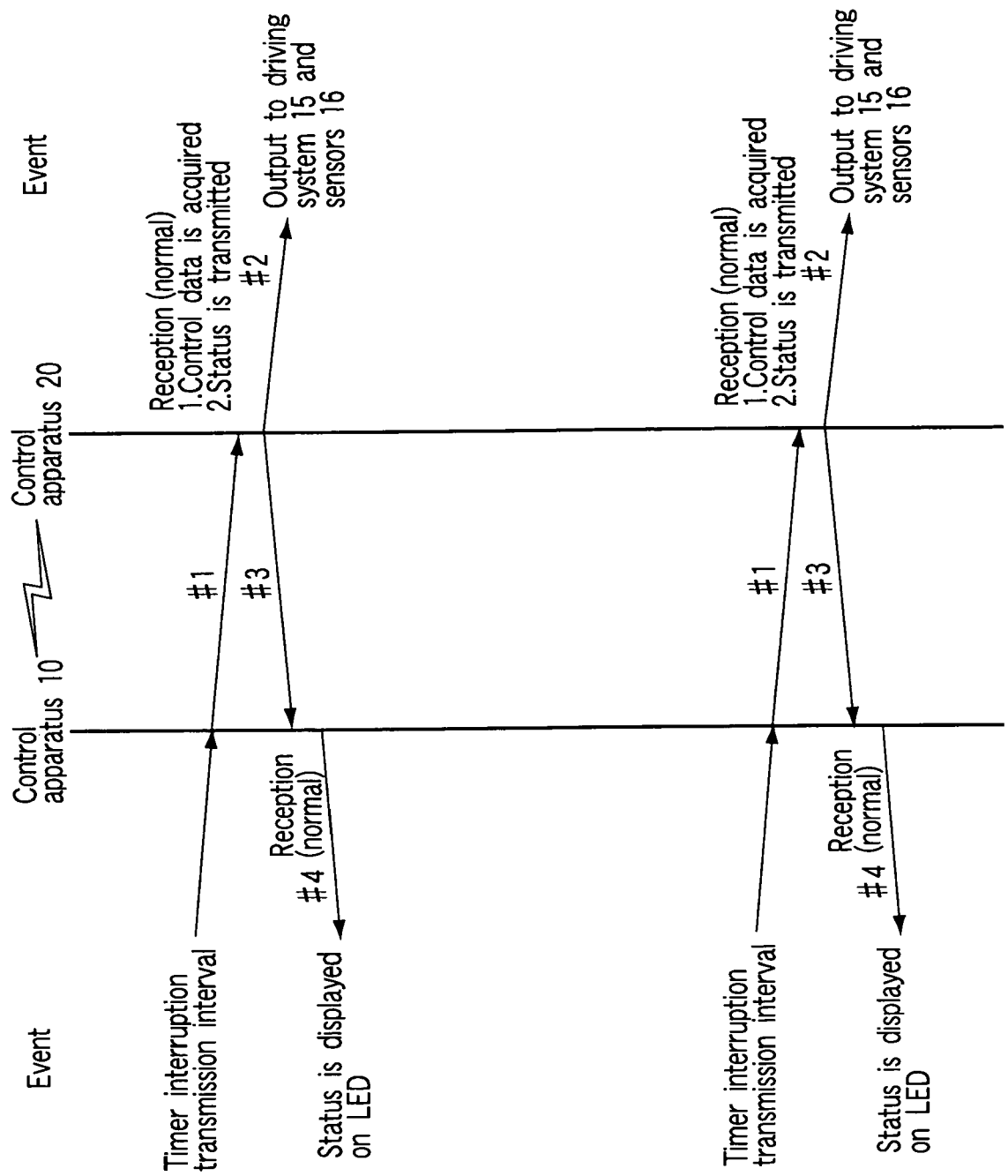
FIG. 9 is a chart for explaining a data transmission/reception sequence in a remote control method by a remote control system (corresponding to the first embodiment) comprised of the control apparatus 10 (no external device) and a controlled apparatus 20.

A data transmission/reception sequence in the remote control method by a remote control system (corresponding to the first embodiment) comprised of the control apparatus 10 (no external device) and the controlled apparatus 20 will be described with reference to FIG. 9.

In the control apparatus 10, the CPU 4b of the control unit 4 generates every predetermined time a Data (with AR) frame containing control data based on the operations and settings of the control stick and various switches included in the external operation input unit 5, and data on a status request. The Data (with AR) frame is modulated by the modulation/demodulation unit 3, and transmitted to the controlled apparatus via the transmission/reception unit 2 and antenna 1 by timer interruption at each predetermined transmission interval (#1).

In this example, no Data (with AR) frame is resent even upon occurrence of a communication error.

If the Data (with AR) frame transmitted from the control apparatus 10 is not normally received by the controlled apparatus 20, a frame containing data on the status is not resent from the controlled apparatus 20 to the control apparatus 10.

In the controlled apparatus 20, if the Data (with AR) frame is normally received by the transmission/reception unit 12 via the antenna 11, the frame is demodulated by the modulation/demodulation unit 13 and supplied to the control unit 14. The CPU 14b of the control unit 14 analyzes the Data (with AR) frame, extracts the control data from the frame, and generates a predetermined signal on the basis of the control data. The signal is output to the driving system 15 and sensors 16 via the external I/O 14d and communication port 17 (#2).

In the controlled apparatus 20, the CPU 14b of the control unit 14 generates a Data+ACK (w/o AR) frame containing data on the status. The Data+ACK (w/o AR) frame is modulated by the modulation/demodulation unit 13, and transmitted to the control apparatus 10 via the transmission/reception unit 12 and antenna 11 (#3).

In the control apparatus 10, if the Data+ACK (w/o AR) frame transmitted from the controlled apparatus 20 is normally received by the antenna 1 and transmission/reception unit 2, the frame is demodulated by the modulation/demodulation unit 3 and supplied to the CPU 4b of the control unit 4. The CPU 4b of the control unit 4 analyzes the Data+ACK (w/o AR) frame, extracts the data on the status, and generates a predetermined signal on the basis of the data. The signal is sent to the output unit 6 via the external I/O 4d and communication port 7. The output unit 6 provides a predetermined output associated with the status on the LED or the like (#4).

It is one feature of the present invention that in the series of processes, an LIFS+backoff time is applied as a frame space in communication #1, and the SIFS is applied as a frame space in communication #3.

Figure 10:
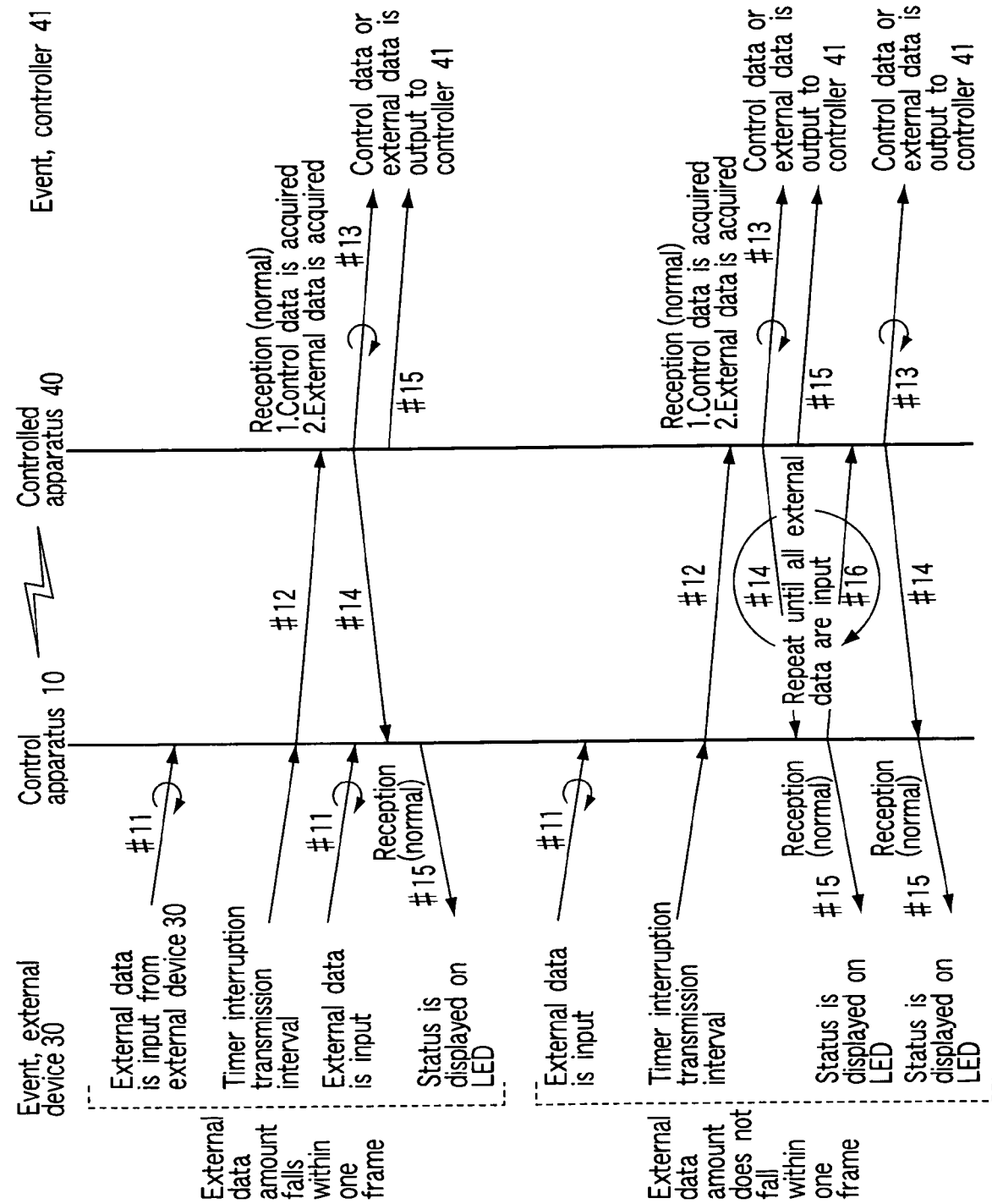
FIG. 10 is a chart for explaining a data transmission/reception sequence in the remote control method by a remote control system (corresponding to the second embodiment) comprised of the control apparatus 10 (connected to an external device 30) and the controlled apparatus 20 (connected to a controller 41)

A data transmission/reception sequence in the remote control method by a remote control system (corresponding to the second embodiment) comprised of the control apparatus 10 (connected to the external device 30) and the controlled apparatus 20 (connected to the controller 41) will be described with reference to FIG. 10. This sequence corresponds to a sequence executed when external data is input from the external device 30 to the control apparatus 10 at the data transmission timing of the basic transfer sequence (FIG. 9). In this example, input of external data from the external device 30 to the control apparatus 10 and communication are asynchronously performed.

The external device 30 asynchronously inputs external data to the control apparatus 10 via the communication port 7 and external I/O 4d (#11).

The external data is temporarily stored in the memory 4a of the control unit 4.

In the control apparatus 10, the CPU 4b of the control unit 4 generates every predetermined time a Data (with AR) frame containing at least any one of control data based on the operations and settings of the control stick and various switches included in the external operation input unit 5, the external data, and data on a status request.

The Data (with AR) frame is modulated by the modulation/demodulation unit 3, and transmitted to the controlled apparatus via the transmission/reception unit 2 and antenna 1 by timer interruption at each predetermined transmission interval (#12).

This sequence is different from the above-mentioned basic transfer sequence (FIG. 9) in that the Data (with AR) frame sent by the control apparatus 10 contains external data.

When external data falls within one frame, data representing that no subsequent data exists is contained in the frame (e.g., the continuation bit of the frame is set to "0"). When external data cannot fall within one frame and cannot be transmitted by one frame, data representing that subsequent data exists is contained in the frame (e.g., the continuation bit of the frame is set to "1").

In this example, no Data (with AR) frame is resent even upon occurrence of a transmission error upon transmission.

If the Data (with AR) frame transmitted from the control apparatus 10 is not normally received by the controlled apparatus 20, no frame containing data on the status is sent back from the controlled apparatus 20.

In the controlled apparatus 20, if the Data (with AR) frame is normally received by the transmission/reception unit 12 via the antenna 11, the frame is demodulated by the modulation/demodulation unit 13 and supplied to the control unit 14. The CPU 14b of the control unit 14 analyzes the Data (with AR) frame, and extracts the external data from the frame. The external data is temporarily stored in the memory 14a of the control unit 14, properly read out from the memory 14a, and transmitted to the controller 41 via the external I/O 14d, the communication port 17, and the standard interface of the PC (#13).

In the controlled apparatus 20, when the continuation bit of the received frame is "0", no subsequent data is determined to exist. The CPU 14b of the control unit 14 generates a Data+ACK (w/o AR) frame containing data on the status. The Data+ACK (w/o AR) frame is modulated by the modulation/demodulation unit 13, and transmitted to the control apparatus 10 via the transmission/reception unit 12 and antenna 11 (#14).

In the control apparatus 10, if the Data+ACK (w/o AR) frame transmitted from the controlled apparatus 20 is received by the antenna 1 and transmission/reception unit 2, the frame is demodulated by the modulation/demodulation unit 3 and supplied to the CPU 4b of the control unit 4. The CPU 4b of the control unit 4 analyzes the Data+ACK (w/o AR) frame, extracts the data on the status, and generates a predetermined signal on the basis of the data. The signal is sent to the output unit 6 via the external I/O 4d and communication port 7. The output unit 6 provides a predetermined output associated with the status on the LED or the like (#15). In this way, when no subsequent data exists, no further Data (with AR) frame is transmitted, and no ACK frame is resent regardless of whether external data exists.

The flow of communication when external data falls within one frame has been explained. When external data does not fall within one frame, the following processes are done.

In the controlled apparatus 20, when the continuation bit of the received frame is "1", subsequent data is determined to exist. The CPU 14b of the control unit 14 generates a Data+ACK (with AR) frame containing data on the status. The Data+ACK (with AR) frame is modulated by the modulation/demodulation unit 13, and transmitted to the control apparatus 10 via the transmission/reception unit 12 and antenna 11 (#14).

In the control apparatus 10, if the Data+ACK (with AR) frame transmitted from the controlled apparatus 20 is received by the antenna 1 and transmission/reception unit 2, the frame is demodulated by the modulation/demodulation unit 3 and supplied to the CPU 4b of the control unit 4. The CPU 4b of the control unit 4 analyzes the Data+ACK (with AR) frame, extracts the data on the status, and generates a predetermined signal on the basis of the data on the status. The signal is output to the external output unit 6. The output unit 6 provides a predetermined output associated with the status on the LED or the like (#15).

If external data to be transmitted remains, the control apparatus 10 repeats the above-described processes (#12 to #15) to sequentially send Data (with AR) frames containing the remaining external data (#16).

When a maximum number of Data (with AR) frames are sent in the same frame sequence, no further transmission is executed regardless of whether external data remains, and only an ACK frame is sent back. This considers simultaneous use of pairs of apparatuses at the same frequency.

It is another feature of the present invention that in the series of processes, the LIFS is applied as a frame space in communication #12, and the SIFS is applied as a frame space in communication #14 and #16.

Figure 11:
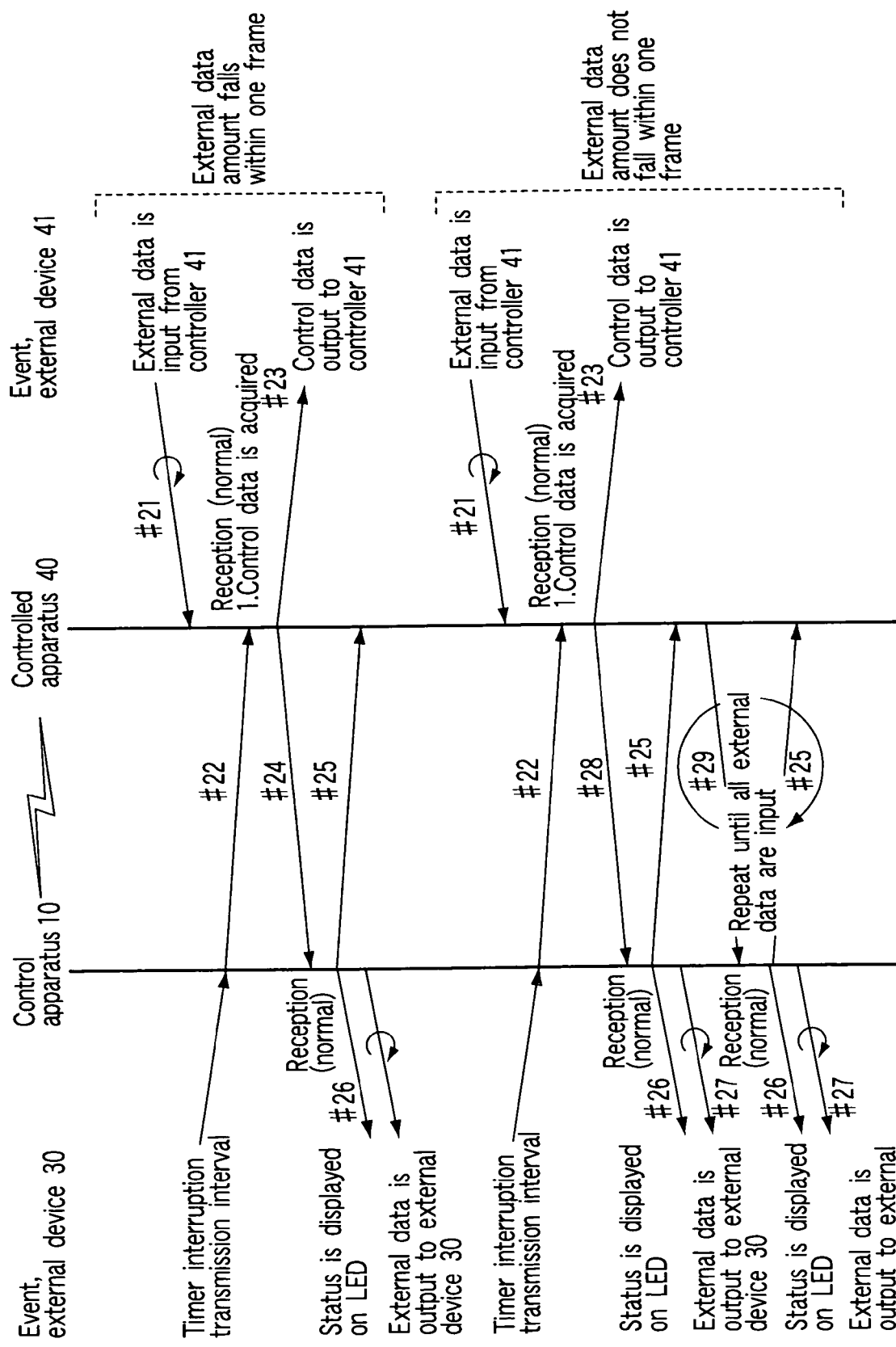
FIG. 11 is a chart for explaining a data transmission/reception sequence in the remote control method by the remote control system (corresponding to the second embodiment) comprised of the control apparatus 10 (connected to the external device 30) and the controlled apparatus 20 (connected to the controller 41)

A data transmission/reception sequence in the remote control method by the remote control system (corresponding to the second embodiment) comprised of the control apparatus 10 (connected to the external device 30) and the controlled apparatus 20 (connected to the controller 41) will be described with reference to FIG. 11. This sequence corresponds to a sequence executed when external data is input from the controller 41 to the controlled apparatus 20 at the data transmission timing of the basic transfer sequence (FIG. 9). In this example, input of external data from the controller 41 to the controlled apparatus 20 and communication are asynchronously performed.

When external data is asynchronously input from the controller 41 to the controlled apparatus 20 via the communication port 17 and external I/O 14d, the controlled apparatus 20 temporarily stores the external data in the memory 14a of the control unit 4 (#21).

In the control apparatus 10, the CPU 4b of the control unit 4 generates every predetermined time a Data (with AR) frame containing control data or external data based on the operations and settings of the control stick and various switches included in the external operation input unit 5, and data on a status request. The Data (with AR) frame is modulated by the modulation/demodulation unit 3, and transmitted to the controlled apparatus via the transmission/reception unit 2 and antenna 1 at each predetermined transmission interval (#22).

In this example, no Data (with AR) frame is resent even upon occurrence of a transmission error upon transmission.

If the Data (with AR) frame transmitted from the control apparatus 10 is not normally received by the controlled apparatus 20, no frame containing data on the status is sent back from the controlled apparatus 20.

In the controlled apparatus 20, if the Data (with AR) frame is normally received by the transmission/reception unit 12 via the antenna 11, the frame is demodulated by the modulation/demodulation unit 13 and supplied to the control unit 14. The CPU 14b of the control unit 14 analyzes the Data (with AR) frame, and extracts the control data or external data from the frame. The extracted data is temporarily stored in the memory 14a of the control unit 14, properly read out from the memory 14a, and transmitted to the controller 41 via the external I/O 14d, the communication port 17, and the standard interface of the PC (#23).

In the controlled apparatus 20, the CPU 14b of the control unit 14 generates a Data+ACK (w/o AR) frame containing data on the status and the external data from the controller 41. The Data+ACK (w/o AR) frame is modulated by the modulation/demodulation unit 13, and transmitted to the control apparatus 10 via the transmission/reception unit 12 and antenna 11 (#24).

When the external data from the controller 41 falls within one frame, data representing that no subsequent data exists is contained in the frame (e.g., the continuation bit of the frame is set to "0"). When the external data cannot fall within one frame and cannot be transmitted by one frame, data representing that subsequent data exists is contained in the frame (e.g., the continuation bit of the frame is set to "1").

In the control apparatus 10, if the Data+ACK (w/o AR) frame transmitted from the controlled apparatus 20 is received by the antenna 1 and transmission/reception unit 2, the frame is demodulated by the modulation/demodulation unit 3 and supplied to the CPU 4b of the control unit 4. The CPU 4b of the control unit 4 analyzes the Data+ACK (w/o AR) frame, extracts the data on the status, and generates a predetermined signal on the basis of the data. The signal is sent to the output unit 6 via the external I/O 4d and communication port 7. The output unit 6 provides a predetermined output associated with the status on the LED or the like (#26).

At this time, when the continuation bit of the received Data+ACK (w/o AR) frame is "0", the CPU 4b of the control unit 4 determines that no subsequent external data exists. The control apparatus 10 sends back an ACK frame to the controlled apparatus 20 (#25).

In the control apparatus 10, the external data extracted by analysis of the Data+ACK (w/o AR) frame is temporarily stored in the memory 4a. Such external data are properly read out from the memory 4a, and sequentially transmitted to the external device 30 via the external I/O 4d, the communication port, and the standard interface of the PC (#27).

The flow of communication when external data falls within one frame has been explained. When external data does not fall within one frame, the following processes are done.

In the control apparatus 10, when the continuation bit of the received Data+ACK (w/o AR) frame is "1", the CPU 4b of the control unit 4 determines that subsequent external data exists. Also in this case, the control apparatus 10 sends back an ACK frame to the controlled apparatus 20 (#25).

If external data to be transmitted remains, the controlled apparatus 20 repeats the above-described processes (#21 to #27) to sequentially send Data (with AR) frames containing the remaining external data (#28 and #29).

When a maximum number of Data (with AR) frames are sent in the same frame sequence, no further transmission is executed regardless of whether external data remains, and only an ACK frame is sent back.

It is still another feature of the present invention that in the above processes, the LIFS is applied as a frame space in communication #22 and #27, and the SIFS is applied as a frame space in communication #24, #28, and #29.

The processing sequence, i.e., communication method when external data is input to either the control apparatus 10 or controlled apparatus 20 has been explained. A processing sequence when external data are input to both the control apparatus 10 and controlled apparatus 20 is implemented by composite processes, and a repetitive description will be omitted.

Figure 12:
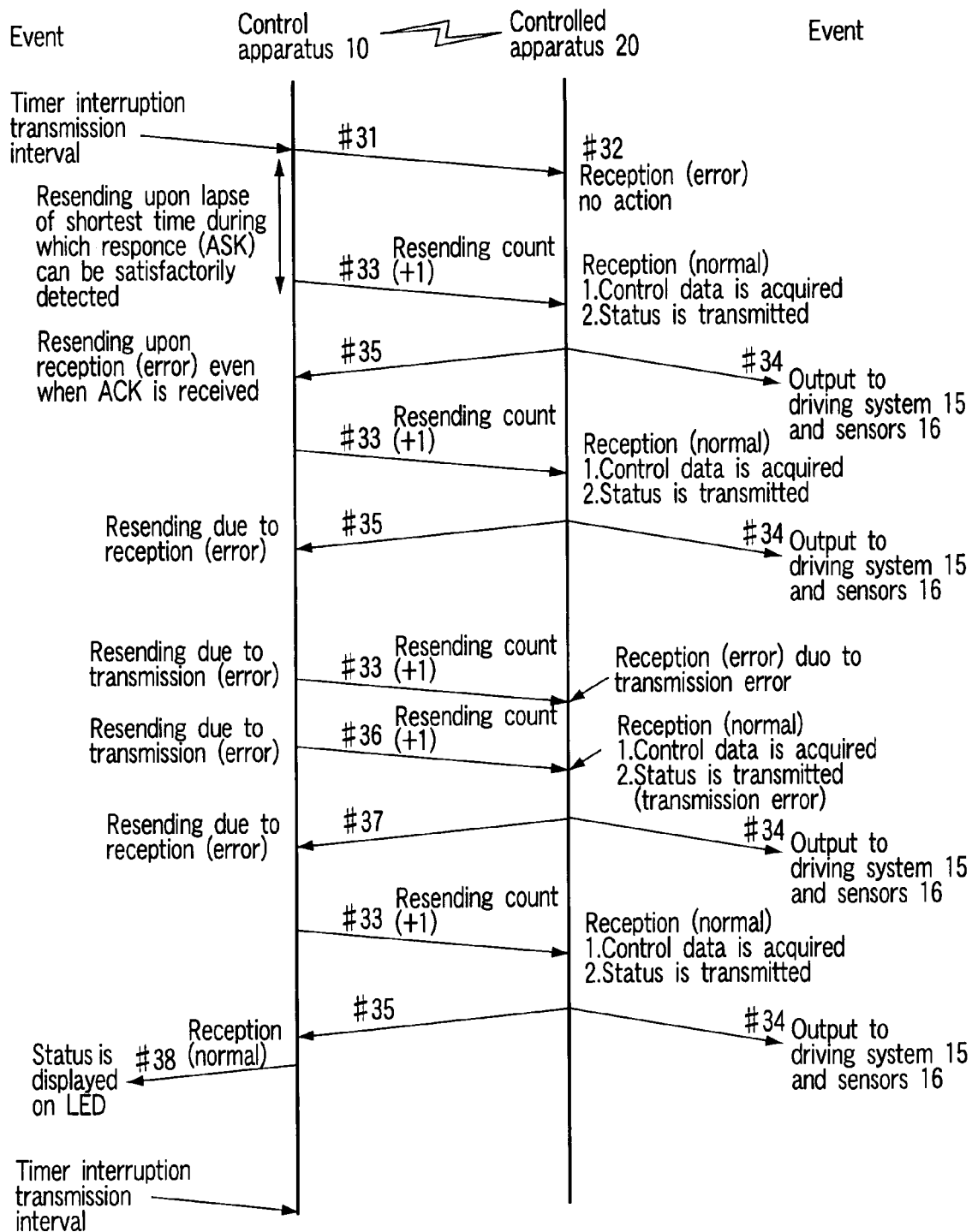
FIG. 12 is a chart for explaining a communication sequence for resending when a frame sequence stops due to a predetermined factor.

A communication sequence for resending when a frame sequence stops due to a predetermined factor will be explained in detail with reference to FIG. 12.

According to the communication sequence, a Data (with AR) frame is transmitted from the control apparatus 10 to the controlled apparatus 20. If no Data+ACK frame or ACK frame is sent back as a response from the controlled apparatus 20 to the control apparatus 10, the frame sequence stops. A new frame sequence starts for the untransmitted Data (with AR) frame, and transmission starts.

In resending the untransmitted Data (with AR) frame from the control apparatus 10 to the controlled apparatus 20, the count value of the resending count is incremented (+1), and data of the same contents as those of a previous frame is transmitted except a case in which the FCS has changed. Control data is replaced with the latest one. The communication sequence will be described in detail on the basis of this outline.

In the control apparatus 10, the CPU 4b of the control unit 4 generates every predetermined time a Data (with AR) frame containing control data based on the operations and settings of the control stick and various switches included in the external operation input unit 5, and data on a status request. The Data (with AR) frame is modulated by the modulation/demodulation unit 3, and transmitted to the controlled apparatus via the transmission/reception unit 2 and antenna 1 by timer interruption at each predetermined transmission interval (#31). If an error occurs in the external device 30 in reception for this transmission, no ACK frame is sent back from the external device 30 to the control apparatus 10 (#32).

In the control apparatus 10, when no ACK frame is received from the controlled apparatus 20 even upon the lapse of the shortest time during which a response (ACK frame) can be satisfactorily detected, the Data (with AR) frame is resent (#33).

At this time, the control data contained in the Data (with AR) frame is updated to the latest one, and the count value of the resending count is incremented by one. Resending is repeated up to a preset resending count, but the present invention is not limited to this.

In the control apparatus 10, even when an error occurs in transmission, the Data (with AR) frame is resent, similar to #33 (#36). In the controlled apparatus 20, even when an error occurs in transmission, no operation is performed, and no frame is resent (#37).

In the controlled apparatus 20, if the Data (with AR) frame is normally received by the transmission/reception unit 12 via the antenna 11, the frame is demodulated by the modulation/demodulation unit 13 and supplied to the control unit 14. The CPU 14b of the control unit 14 analyzes the Data (with AR) frame, extracts the control data from the frame, and generates a predetermined signal on the basis of the control data. The signal is output to the driving system 15 and sensors 16 via the external I/O 14d (#34).

In the controlled apparatus 20, the CPU 14b of the control unit 14 generates a Data+ACK (w/o AR) frame containing data on the status. The Data+ACK (w/o AR) frame is modulated by the modulation/demodulation unit 13, and transmitted to the control apparatus 10 via the transmission/reception unit 12 and antenna 11 (#35).

In the control apparatus 10, if the Data+ACK (w/o AR) frame transmitted from the controlled apparatus 20 is normally received by the antenna 1 and transmission/reception unit 2, the frame is demodulated by the modulation/demodulation unit 3 and supplied to the CPU 4b of the control unit 4. The CPU 4b of the control unit 4 analyzes the Data+ACK (w/o AR) frame, extracts the data on the status, and generates a predetermined signal on the basis of the data. The signal is sent to the output unit 6 via the external I/O 4d and communication port 7. The output unit 6 provides a predetermined output associated with the status on the LED or the like (#38).

It is still another feature of the present invention that in the above processes, the LIFS is applied as a frame space in #31, and the SIFS is applied as a frame space in #33, #35, #36, and #37.

In addition, a beacon is sent by the priority controller 50 upon each timer interruption.

Classification of communication based on priority will be explained with reference to FIG. 13.

The remote control system according to the embodiment sets stepwise priorities on the basis of, as data on the priority, the first data for specifying a control apparatus whose communication is given priority, the second data for specifying the priority controller 50, and the third data unique to a use opportunity. In the following description, for example, classification of stepwise priorities, i.e., first to third priorities is determined by HS, GID, and PNO (respectively corresponding to examples of the first to third data) contained in a beacon frame sent by the priority controller 50. A method of setting a communication time dedicated to communication at the first priority and discriminating communication at the first priority from communication at the second and third priorities will be explained.

The sending interval of a beacon frame sent by one priority controller 50 is represented by the product DI×BI of DI and BI values contained in the beacon frame. When sending of the beacon frame starts after the MIFS is applied as a frame space, a transmission time at the first priority and a transmission time at the second and third priorities are classified and set at a data transmission interval (represented by DI in FIG. 13) set in the DI subfield.

Figure 13:
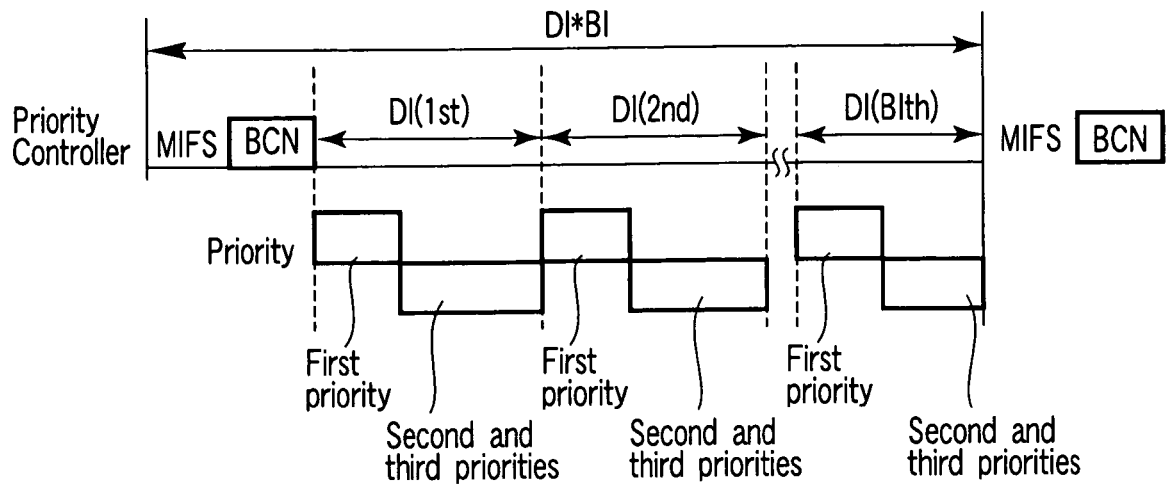
FIG. 13 is a timing chart for explaining classification of communication based on priority.

In classification of communication based on the priority shown in FIG. 13, the second and third priorities are considered as one priority, and communication is classified between the first priority as the highest priority and the remaining priorities (second and third priorities). However, the present invention is not limited to this.

Communication by the control apparatus 10 having the first priority will be described in more detail with reference to FIG. 14. In this case, the first priority is assigned to control apparatuses 10-1 to 10-n and controlled apparatuses 20-1 to 20-n.

Figure 14:
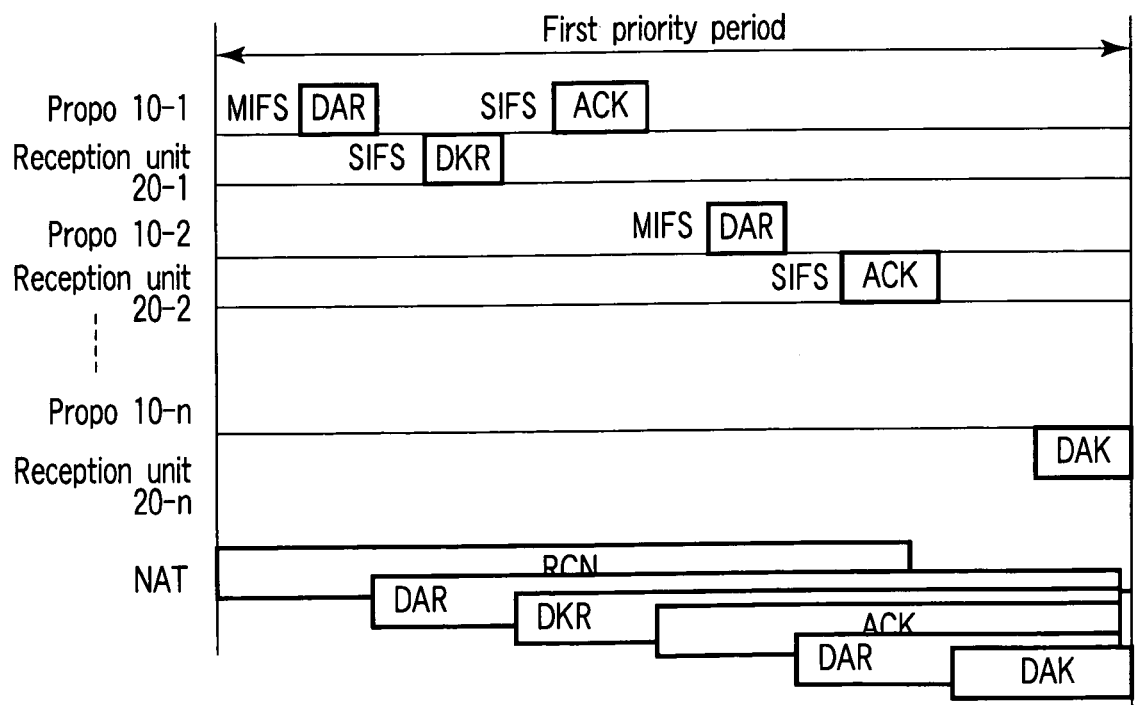
FIG. 14 is a timing chart for explaining communication by the control apparatus 10 having "high" priority.

In FIG. 14, DAR means Data (with AR), DKR means Data+ACK (with AR), and DAK means Data+ACK (w/o AR). These frames have been described above, and a description of the meanings will be omitted.

For the first priority, a communication time is ensured after the end of a beacon frame every DI time, as described above. During one communication period, communication is done for each frame sequence in an order described in the HS subfield of the beacon frame. In this example, communication is performed for each frame sequence in a described order of the control apparatus 10-1, 10-2, . . . , 10-n.

When the data transmission interval DI is shorter than the communication period of the first priority, communication by the next control apparatus 10 having the first priority does not start till the end of the communication period of the preceding control apparatus 10 having the first priority. In this case, communication by control apparatuses 10 having the second and third priorities does not start.

After communication at the first priority ends, communication by control apparatuses having the second and third priorities starts.

Referring back to FIG. 13, a frame sequence by a control apparatus 10 having the second priority starts upon the lapse of the data transmission interval DI designated by the DI subframe of the beacon frame after a preceding control apparatus 10 performs transmission. A frame sequence by a control apparatus 10 having the third priority starts upon the lapse of a time designated by the product of the values of the DI and LPI subframes of the beacon frame after a preceding control apparatus 10 performs transmission.

A network allocation time (NAT) shown on the lowest stage of FIG. 14 will be described by mainly referring to its role and feature.

The NAT is a time setting used not to start transmission by a control apparatus 10 while one control apparatus 10 executes a series of frame sequences or communication by a control apparatus 10 having the first priority is performed.

This value is set on the basis of the value of the Dur subfield of each frame.

When a frame having a new value in the Dur subfield is received during counting of the NAT and the new value is larger than the current NAT, a new NAT is set (e.g., in FIG. 14, the value is sequentially updated from BCN→DAR→DKR→ACK).

With this setting, communication by a control apparatus 10 having the first priority can be performed without starting a frame sequence by a control apparatus 10 having a priority other than the first priority or the controlled apparatus 20 and without any inhibition by another communication.

In the description of FIGS. 13 and 14, when the first, second, and third priorities are expressed by, e.g., priority levels, they correspond to priorities "high", "middle", and "low". However, the present invention is not limited to this relationship.

The remote control system and remote control method according to the embodiment of the present invention have been described. Applications of the system and method will be briefly explained.

Figure 15:
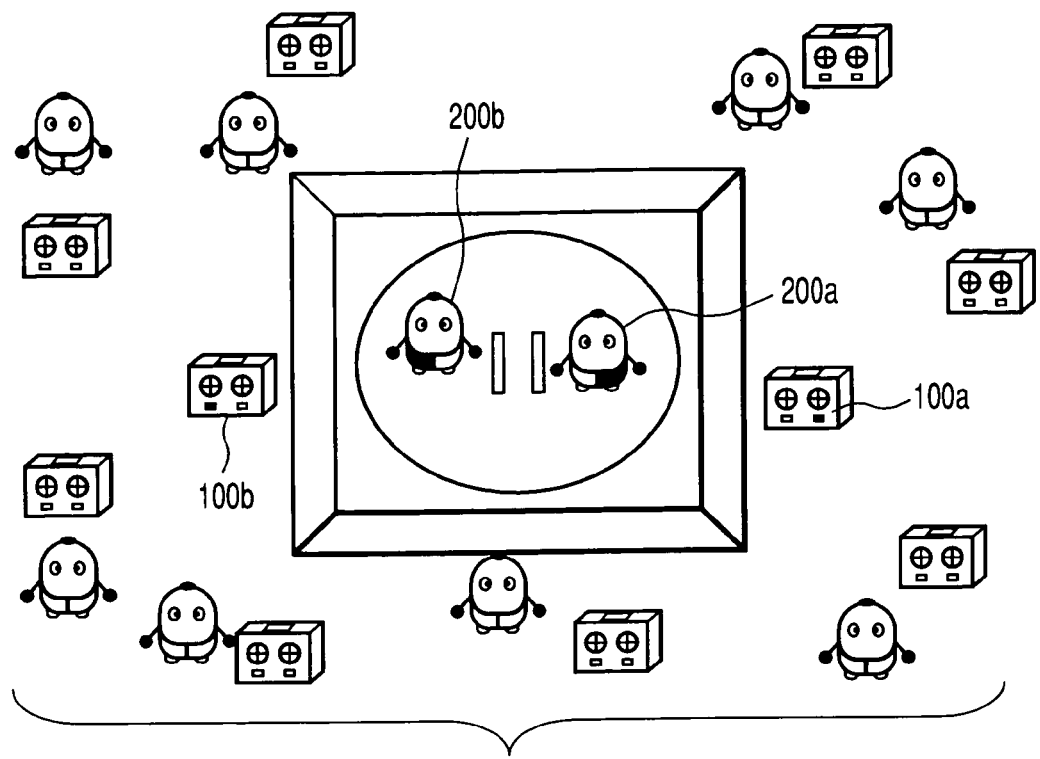
FIG. 15 is a view showing an application of the present invention to a robot sumo tournament.

FIG. 15 shows an application to a robot sumo tournament. In this tournament, two robots 200a and 200b using controlled apparatuses 20 are placed in the ring. The robots 200a and 200b have a match by remote-controlling them by corresponding propos 100a and 100b using control apparatuses 10. Generally in the venue of the robot sumo tournament, pairs of robots simultaneously have matches. When digital time-division communication is executed using the digital radio communication technique by applying the present invention, the robots 200a and 200b can perform complicated operation. Further, many communication channels can be assigned, and the tournament can smoothly progress without any influence of a communication failure.

When pairs of robots simultaneously have matches and priority controllers for controlling the priority of each pair are simultaneously used, the priority is determined by HS, GID, and PNO described above. Since GID changes between priority controllers, communication based on the priority of each pair is not inhibited by a beacon frame transmitted by the priority controller o another pair.

Figure 16:
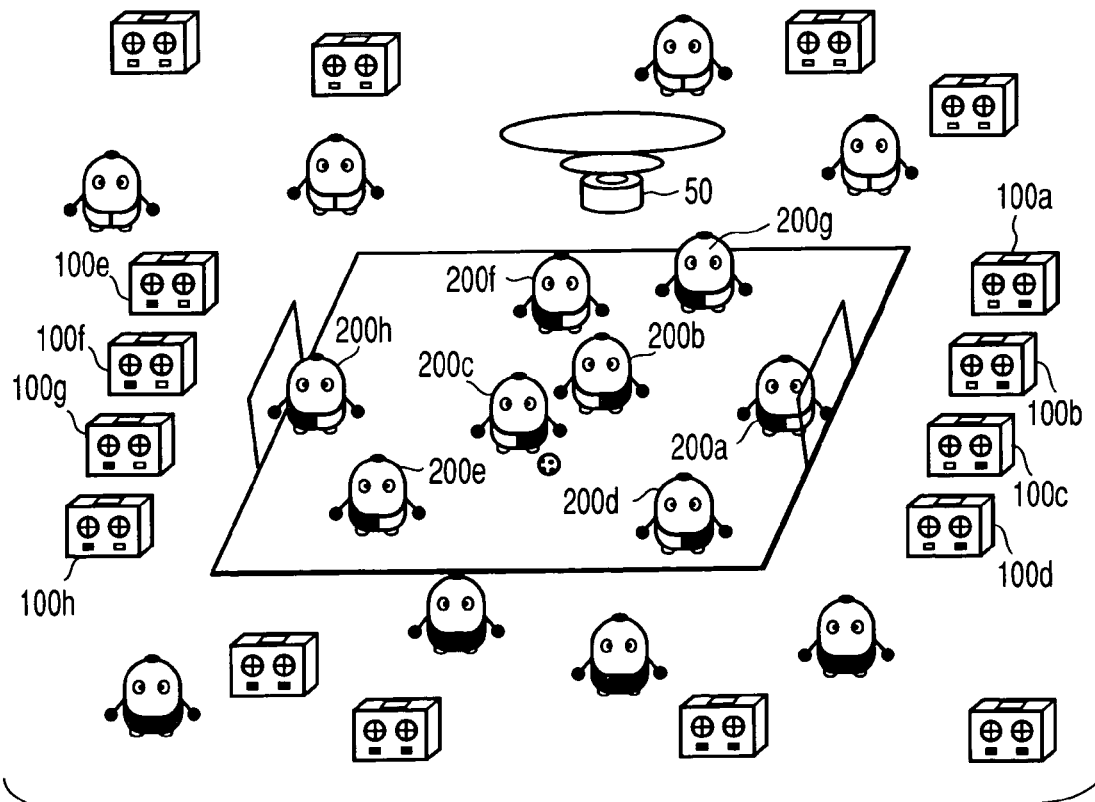
FIG. 16 is a view showing an application of the present invention to a robot football tournament.

FIG. 16 shows an application to a robot football tournament.

In an example of the robot football tournament, propos 100a to 100h using control apparatuses 10 must simultaneously operate corresponding robots 200a to 200h using controlled apparatuses 20. By adopting the priority controller 50, the priority of communication by the propos 100a to 100h can be ensured, and the game can smoothly progress.

If predetermined data for designating predetermined operations are transmitted from the propos 100a to 100h to the robots 200a to 200h in accordance with the above-described flow, the robots 200a to 200h analyze the data to drive and control their driving systems and execute more complicated operation.

In an application to the robot football tournament, the priority controller may control the priorities of a plurality of control apparatuses 10 scattered in a wide range. Alternatively, the range may exceed the communication range of one priority controller. In this case, a plurality of priority controllers having the same GID value can be used to realize preferable control based on priority.

In this fashion, in an example of the robot football tournament, a complicated instruction such as "combination of operations" by a plurality of player robots can be issued by transmitting the data. This can implement comprehensive simultaneous control of many robots. The data also contains a command for a predetermined instruction/order.

Note that the controlled apparatus, remote control system, and remote control method of the present invention are not limited to applications to the robot sumo tournament and robot football tournament, and can be applied to various purposes.

The embodiments of the present invention have been described above. The present invention is not limited to them, and can be variously modified and changed without departing from the spirit and scope of the invention. For example, the above embodiments assume the use of time division. However, the present invention can employ code division multiple access (CDMA) of detecting another carrier (total power or correlation signal) and avoiding transmission conflict.

In the above-described embodiments, when the control apparatus 10 does not receive any ACK frame from the controlled apparatus 20 even upon the lapse of the shortest time during which a response (ACK frame) can be satisfactorily detected, resending after updating control data contained in a Data (with AR) frame to the latest one is repeated up to a preset resending cont. It is also possible to set, e.g., a predetermined subfield in a frame and repeat transmission/reception of successive frames on the basis of the setting value of the subfield. In this case, an ACK frame is transmitted/received upon the completion of transmitting control data or the like from the control apparatus 10 and controlled apparatus 20.

As has been described above in detail, the present invention has the following effects.

More specifically, the present invention can provide a control apparatus and controlled apparatus which utilize a digital radio communication technique, prevent a communication failure, enable assignment of many communication channels, realize two-way communication at a high transmission rate, and abruptly increase the data communication amount even in a situation in which pairs of control apparatuses and controlled apparatuses simultaneously use the same frequency, and a remote control system and remote control method using these apparatuses.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A remote control system, which allows radio communication in a situation, comprising: a plurality of pairs of control apparatuses; and controlled apparatuses; that are respectively made to correspond to each other in advance and simultaneously use a same frequency;

each control apparatus including;

first input/output means for external connection, first control means for controlling to transmit a first frame to the controlled apparatus corresponding to the control apparatus on the basis of a predetermined priority by generating the first frame having at least one of information obtained via the first input/output means and information on the controlled apparatus corresponding to the control apparatus, and controlling to externally output a first signal via the first input/output means by analyzing a second frame from the controlled apparatus corresponding to the control apparatus, and first transmission/reception means for transmitting the first frame generated by the first control means to the controlled apparatus corresponding to the control apparatus on the basis of the predetermined priority, and receiving the second frame from the controlled apparatus corresponding to the control apparatus, and each controlled apparatus including;

second transmission/reception means for receiving the first frame from the control apparatus corresponding to the controlled apparatus, and transmitting the second frame to the control apparatus corresponding to the controlled apparatus, second input/output means for external connection, and second control means for analyzing the first frame to externally output a second signal via the second input/output means, and generating the second frame having at least one of information obtained via the second input/output means and information on the control apparatus corresponding to the controlled apparatus.

2. A remote control system according to claim 1, further comprising a priority controller to set the predetermined priority associated with transmission by the control apparatus, when the priority controller sets the predetermined priority associated with transmission by the control apparatus corresponding to the controlled apparatus, the first control means of the control apparatus corresponding to the controlled apparatus controlling to transmit the first frame to the controlled apparatus corresponding to the control apparatus on the basis of the priority.

3. A remote control system according to claim 1, further comprising a priority controller which originates first information for specifying a control apparatus as a self control apparatus whose communication is given priority, when the first information specifies the self control apparatus, the first control means of the self control apparatus determining that the self control apparatus has first priority, and controlling to transmit the first frame to the controlled apparatus corresponding to the self control apparatus at a timing determined on the basis of the first priority.

4. A remote control system according to claim 1, further comprising a priority controller which originates second information for specifying the priority controller and third information unique to a use opportunity, the control apparatus further comprising storage means for storing at least fourth information for specifying the priority controller and fifth information unique to a use opportunity, and when the second information and the third information which are originated by the priority controller coincide with the fourth information and the fifth information which are stored in the storage means, the first control means of the control apparatus determining that the control apparatus has second priority, and controlling to transmit the first frame to the controlled apparatus corresponding to the control apparatus at a timing determined on the basis of the second priority.

5. A remote control system according to claim 1, further comprising a priority controller which originates first information for specifying a control apparatus as a self control apparatus whose communication is given priority, second information for specifying the priority controller, and third information unique to a use opportunity, the control apparatus further comprising storage means for storing at least fourth information for specifying the priority controller and fifth information unique to a use opportunity, and the first control means of the self control apparatus determining, when the first information specifies the control apparatus as the self control apparatus, that the self control apparatus has first priority, and controlling to transmit the first frame to the controlled apparatus corresponding to the self control apparatus at a timing determined on the basis of the first priority, when the first information does not specify the control apparatus as the self control apparatus, and the second information and the third information which are originated by the priority controller coincide with the fourth information and the fifth information which are stored in the storage means, determining that the control apparatus has second priority, and controlling to transmit the first frame to the controlled apparatus corresponding to the control apparatus at a timing determined on the basis of the second priority, and when the first information does not specify the control apparatus as the self control apparatus, and at least one of the second information and the third information which are originated by the priority controller does not coincide with the fourth information and the fifth information which are stored in the storage means, determining that the control apparatus has third priority, and controlling to transmit the first frame to the controlled apparatus corresponding to the control apparatus at a timing determined on the basis of the third priority.

6. A control apparatus used in a remote control system which allows radio communication in a situation in which a plurality of pairs of control apparatuses and controlled apparatuses that are respectively made to correspond to each other in advance simultaneously use a same frequency, comprising:

input/output means for external connection;

control means for controlling to transmit a first frame to the controlled apparatus corresponding to the control apparatus on the basis of a predetermined priority by generating the first frame having at least one of information obtained via the input/output means and information on the controlled apparatus corresponding to the control apparatus, and controlling to externally output a predetermined signal via the input/output means by analyzing a second frame from the controlled apparatus corresponding to the control apparatus; and transmission/reception means for transmitting the first frame generated by the control means to the controlled apparatus corresponding to the control apparatus on the basis of the predetermined priority, and receiving the second frame from the controlled apparatus corresponding to the control apparatus.

7. A controlled apparatus used in a remote control system which allows radio communication in a situation in which a plurality of pairs of control apparatuses and controlled apparatuses that are respectively made to correspond to each other in advance simultaneously use a same frequency, comprising:

transmission/reception means for receiving a first frame transmitted from the control apparatus corresponding to the controlled apparatus on the basis of a predetermined priority, and transmitting a second frame to the control apparatus corresponding to the controlled apparatus;

input/output means for external connection; and control means for analyzing the first frame to externally output a predetermined signal via the input/output means, and generating the second frame having at least one of information obtained via the input/output means and information on the control apparatus corresponding to the controlled apparatus.

8. A remote control method of allowing radio communication in a situation in which a plurality of pairs of control apparatuses and controlled apparatuses that are respectively made to correspond to each other in advance simultaneously use a same frequency, comprising:

a step of causing each control apparatus to generate by first control means a first frame having at least one of information obtained via first input/output means and information on a controlled apparatus corresponding to each control apparatus, and transmit the first frame to the controlled apparatus corresponding to the control apparatus via first transmission/reception means on the basis of a predetermined priority;

a step of causing the controlled apparatus corresponding to the control apparatus to receive the first frame via second transmission/reception means, analyze the first frame by second control means, and externally output a second signal via second input/output means;

a step of causing the controlled apparatus corresponding to the control apparatus to generate by the second control means a second frame having at least one of information obtained via the second input/output means and information on the control apparatus corresponding to the controlled apparatus, and transmit the second frame to the control apparatus corresponding to the controlled apparatus via the second transmission/reception means; and a step of causing the control apparatus corresponding to the controlled apparatus to receive the second frame from the controlled apparatus via the first transmission/reception means, analyze the second frame by the first control means, and externally output a first signal via the first input/output means.

9. A remote control method according to claim 8, further comprising a step of causing a priority controller to set the predetermined priority associated with transmission by the control apparatus corresponding to the controlled apparatus, when the priority controller sets the predetermined priority associated with transmission by the control apparatus corresponding to the controlled apparatus, the first control means of the control apparatus corresponding to the controlled apparatus controlling to transmit the first frame to the controlled apparatus on the basis of the priority.

10. A remote control method according to claim 8, further comprising a step of causing a priority controller to originate first information for specifying a control apparatus as a self control apparatus whose communication is given priority, when the first information specifies the self control apparatus, the first control means of the self control apparatus determining that the self control apparatus has first priority, and controlling to transmit the first frame to the controlled apparatus corresponding to the self control apparatus at a timing determined on the basis of the first priority.

11. A remote control method according to claim 8, further comprising:

a step of causing a priority controller to originate second information for specifying the priority controller and third information unique to a use opportunity;

a step of causing storage means of the control apparatus to store at least fourth information for specifying the priority controller and fifth information unique to a use opportunity; and a step of causing the first control means of the control apparatus to, when the second information and the third information which are originated by the priority controller coincide with the fourth information and the fifth information which are stored in the storage means, determine that the control apparatus has second priority, and control to transmit the first frame to the controlled apparatus corresponding to the control apparatus at a timing determined on the basis of the second priority.

12. A remote control method according to claim 8, further comprising:

a step of causing a priority controller to originate first information for specifying a control apparatus as a self control apparatus whose communication is given priority, second information for specifying the priority controller, and third information unique to a use opportunity;

a step of causing storage means of the control apparatus to store at least fourth information for specifying the priority controller and fifth information unique to a use opportunity;

a step of causing the first control means of the control apparatus to, when the first information specifies the control apparatus as the self control apparatus, determine that the self control apparatus has first priority, and control to transmit the first frame to the controlled apparatus corresponding to the self control apparatus at a timing determined on the basis of the first priority;

a step of causing the first control means of the control apparatus to, when the first information does not specify the control apparatus as the self control apparatus, and the second information and the third information which are originated by the priority controller coincide with the fourth information and the fifth information which are stored in the storage means, determine that the control apparatus has second priority, and control to transmit the first frame to the controlled apparatus corresponding to the control apparatus at a timing determined on the basis of the second priority; and a step of causing the first control means of the control apparatus to, when the first information does not specify the control apparatus as the self control apparatus, and at least one of the second information and the third information which are originated by the priority controller does not coincide with the fourth information and the fifth information which are stored in the storage means, determine that the control apparatus has third priority, and control to transmit the first frame to the controlled apparatus corresponding to the control apparatus at a timing determined on the basis of the third priority.

* * * * *